(12) United States Patent
Ackaouy et al.

(10) Patent No.: US 7,191,290 B1
(45) Date of Patent: Mar. 13, 2007

(54) APPARATUS AND METHOD FOR TANDEM OPERATION IN A STORAGE NETWORK

(75) Inventors: Emmanuel Ackaouy, San Francisco, CA (US); Matthew B. Amdur, San Francisco, CA (US); Ashish Prakash, Morrisville, NC (US); Kartik Ayyar, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 418 days.

(21) Appl. No.: 10/424,142

(22) Filed: Apr. 25, 2003

Related U.S. Application Data

(63) Continuation-in-part of application No. 10/245,828, filed on Sep. 16, 2002.

(51) Int. Cl.
G06F 12/00 (2006.01)
G12F 12/00 (2006.01)

(52) U.S. Cl. .................. 711/119; 709/219

(58) Field of Classification Search ........... 709/213, 709/219, 225; 711/919; 714/4
See application file for complete search history.

(56) References Cited

U.S. PATENT DOCUMENTS

| | | | |
|---|---|---|---|
| 5,535,375 A | 7/1996 | Eshel et al. | |
| 5,864,852 A | 1/1999 | Luotonen | |
| 5,907,678 A | 5/1999 | Housel, III et al. | |
| 5,924,116 A | 7/1999 | Aggarwal et al. | |
| 5,946,690 A | 8/1999 | Pitts | |
| 5,950,205 A | 9/1999 | Aviani, Jr. | |
| 5,987,506 A | 11/1999 | Carter et al. | |
| 5,991,810 A * | 11/1999 | Shapiro et al. | 709/229 |
| 6,065,058 A | 5/2000 | Hailpern et al. | |
| 6,085,193 A | 7/2000 | Malkin et al. | |
| 6,085,234 A | 7/2000 | Pitts et al. | |
| 6,167,446 A | 12/2000 | Lister et al. | |
| 6,178,461 B1 | 1/2001 | Chan et al. | |
| 6,230,160 B1 | 5/2001 | Chan et al. | |
| 6,282,580 B1 | 8/2001 | Chang | |
| 6,292,835 B1 * | 9/2001 | Huang et al. | 709/235 |
| 6,311,216 B1 | 10/2001 | Smith et al. | |
| 6,370,620 B1 | 4/2002 | Wu et al. | |
| 6,438,652 B1 | 8/2002 | Jordan et al. | |
| 6,442,651 B2 | 8/2002 | Crow et al. | |

(Continued)

OTHER PUBLICATIONS

"Web Cache Coherence" by A. Dingle, et al. Computer Networks & ISDN Systems, No. Holland Publishing. Amsterdam, NL, vol. 28, No. 11, May 1996. pp. 907-920.

(Continued)

*Primary Examiner*—Woo H. Choi
(74) *Attorney, Agent, or Firm*—Arnold M. de Guzman

(57) ABSTRACT

In one embodiment, a method of processing data in a network with multiple proxy caches, includes: pushing cached data in a first proxy cache to at least one other proxy cache in a cluster configuration; caching the data from the first proxy cache; and permitting a client to access the data in the at least one other proxy cache in the cluster configuration. In another embodiment, a method of processing data in a network with multiple proxy caches, includes: providing a snapshot replica from a first server to second server; and permitting a proxy cache to access the second server for data in the snapshot replica, in response to a disconnect operation of the first server.

35 Claims, 13 Drawing Sheets

U.S. PATENT DOCUMENTS

| | | | |
|---|---|---|---|
| 6,505,241 B2 | 1/2003 | Pitts | |
| 6,542,964 B1 | 4/2003 | Scharber | |
| 6,553,411 B1 | 4/2003 | Dias et al. | |
| 6,658,463 B1 * | 12/2003 | Dillon et al. | 709/219 |
| 6,665,705 B1 * | 12/2003 | Daniels-Barnes et al. | 709/203 |
| 6,675,214 B2 | 1/2004 | Stewart et al. | |
| 6,751,608 B1 * | 6/2004 | Cohen et al. | 707/3 |
| 6,823,377 B1 * | 11/2004 | Wu et al. | 709/223 |
| 2002/0004846 A1 | 1/2002 | Garcia-Luna-Aceves | |
| 2002/0004917 A1 * | 1/2002 | Malcolm et al. | 714/4 |
| 2002/0026511 A1 * | 2/2002 | Garcia-Luna-Aceves et al. | 709/226 |
| 2002/0026560 A1 | 2/2002 | Jordan et al. | |
| 2003/0120867 A1 | 6/2003 | Cuomo et al. | |
| 2003/0145112 A1 | 7/2003 | Keller et al. | |
| 2003/0149737 A1 | 8/2003 | Lambert et al. | |
| 2003/0163731 A1 * | 8/2003 | Wigley et al. | 713/201 |
| 2003/0233423 A1 | 12/2003 | Dilley et al. | |
| 2004/0044740 A1 * | 3/2004 | Cudd et al. | 709/217 |

OTHER PUBLICATIONS

"A Scalable Web Cache Consistency Architecture" by H. Yu, et al. Computer Communication Review, Asso. for Computer Machinery, NY, US, vol. 29, No. 4, Oct. 1996. pp. 163-174.

* cited by examiner

Forward Proxy Configuration

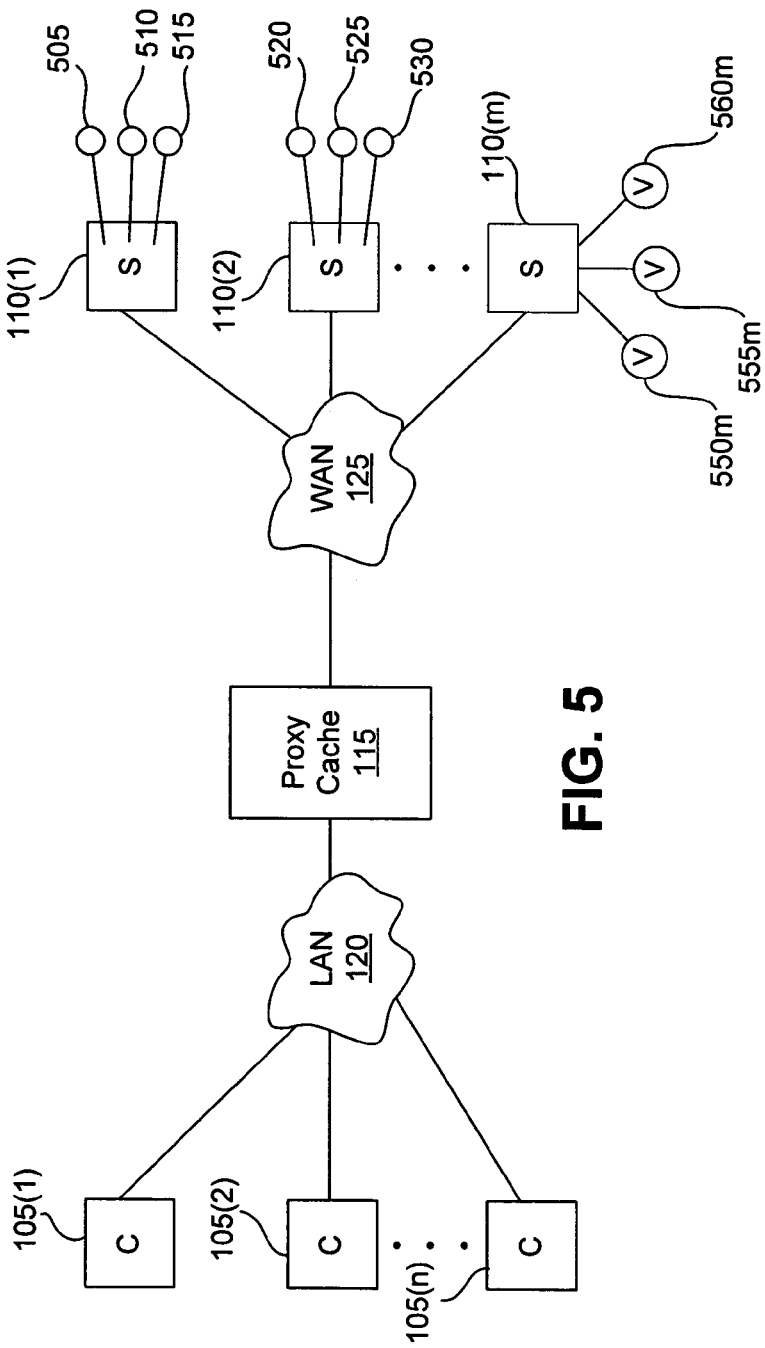

APPARATUS AND METHOD FOR TANDEM OPERATION IN A STORAGE NETWORK

CROSS-REFERENCE TO RELATED APPLICATION

This application is a continuation-in-part of and claims the benefit of U.S. patent application Ser. No. 10/245,828, by Emmanuel Ackaouy et al., filed Sep. 16, 2002, and entitled "APPARATUS AND METHOD FOR A PROXY CACHE". Application Ser. No. 10/245,828 is hereby fully incorporated herein by reference.

TECHNICAL FIELD

Embodiments of the present invention relate generally to computer networks. More particularly, embodiments of the present invention relate generally to file systems and storage devices.

BACKGROUND

Large organizations are geographically distributed. They may have a few large central sites that have high-speed local area networks (LANs) where local data can be consolidated into a central area or system. However, large organizations may also have smaller remote offices, branch offices, or/and other edge locations that have lower bandwidth and higher latency connectivity to the centralized data repositories. The edge locations may not have information technology (IT) staffs to service local data needs such as, for example, backing up the servers or replacing failing hardware and/or software. Users at remote offices can typically see much poorer performance, reliability, and services from the corporate IT infrastructure than their counterparts at a central site.

Sharing data across large sites is also cumbersome. These sites are usually connected by dedicated high bandwidth links. However, the geographical distances between sites impose latencies that are unacceptable for many applications.

The current solution is to provide a file server (such as a filer from Network Appliance, Inc.) at each edge location and automatically back up the server to a central location over the wide area network (WAN). Read-only data that is shared across sites can be replicated by using asynchronous mirroring. Hypertext Transfer Protocol (HTTP) and streaming traffic can be cached using a network cache such as, for example, the NetCache appliance from Network Appliance, Inc.

Managing file servers at edge locations can be expensive in terms of cost and/or resource. The task of backing up data across WANs requires careful planning and administration. Replicating read-only volumes across WANs is often an overkill. In many cases, only a small percentage of the volume is actually used on a regular basis (e.g., /usr/local/bin). Typically, dynamic data sets (e.g., home directories of a user) cannot be replicated and must be managed independently at each location.

Therefore, the above-described products and approaches are limited to particular capabilities and features and suffer from a number of constraints.

SUMMARY OF EMBODIMENTS OF THE INVENTION

In one embodiment of the invention, a method of processing data in a network with multiple proxy caches, includes: pushing cached data in a first proxy cache to at least one other proxy cache in a cluster configuration; caching the data from the first proxy cache; and permitting a client to access the data in the at least one other proxy cache in the cluster configuration.

In another embodiment, a method of processing data in a network with multiple proxy caches, includes: providing a snapshot replica from a first server to second server; and permitting a proxy cache to access the second server for data in the snapshot replica, in response to a disconnect operation of the first server.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Embodiments of the present invention are described with reference to the following figures, wherein like reference numerals refer to like parts throughout the various views unless otherwise specified.

FIG. 4 is a block diagram of a file handle.

FIG. 5 is a block diagram illustrating example volumes in each server.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1A:
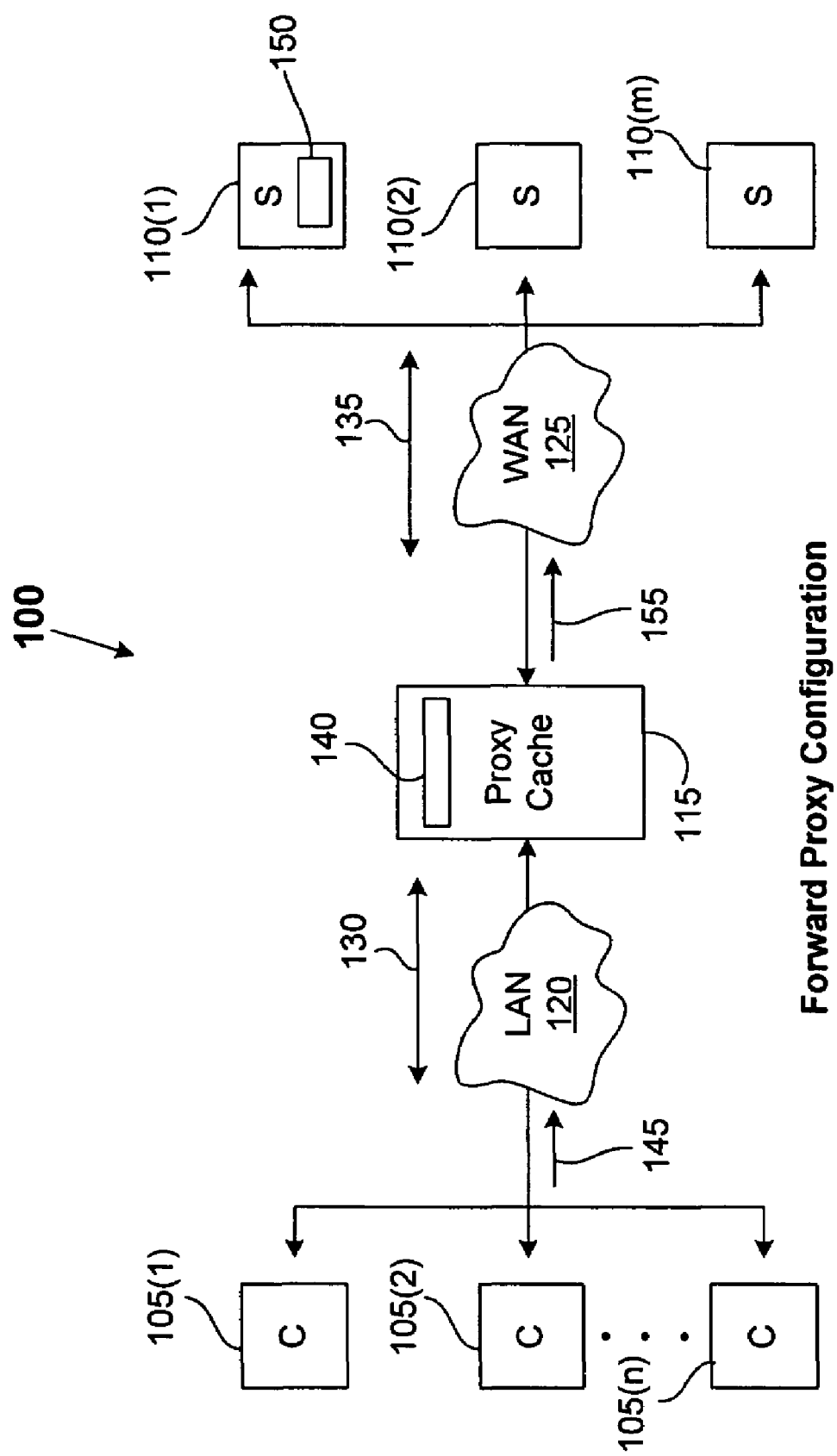
FIG. 1A is a block diagram of an apparatus in accordance with an embodiment of the invention.

FIG. 1A is a block diagram of a network 100, including client devices 105(1) to 105(n), servers 110(1) to 110(m), and a proxy cache (or proxy appliance) 115, with the components forming a forward proxy configuration in accordance with an embodiment of the invention. As described below, another embodiment of the invention provides a network including at least one proxy cache in a reverse proxy configuration. Embodiments of the invention include or provide at least some of the following features, as described below: (1) location independence and consolidation of name space; (2) on-demand sparse consistent replication of data; (3) load balancing; (4) remote disconnected access and modification of data; and/or (5) protocol transformation. These applications of virtualization make it possible to build a distributed storage infrastructure without incurring the prohibitive costs associated with conventional methods.

The above-variables n and m may be any suitable integer value. Thus, the number of client devices (generally referred herein as client(s) 105) and the number of servers (generally referred herein as server(s) 110) may vary. For example, the network 100 may be implemented with only one client device 105 and/or with only one server 110. The client devices 105 may be coupled via local area network (LAN) 120 to the proxy cache 115, while the servers 110 may be coupled via wide area network (WAN) 125 to the proxy cache 115.

The forward proxy configuration in FIG. 1A permits data to be cached on-demand by the proxy cache 115. Thus, on-demand sparse consistent replication of data is permitted by the proxy cache 115. This on-demand caching operation is more efficient than conventional replication techniques and advantageously does not require the special software that is used in conventional replication techniques.

In an embodiment, the proxy cache 115 and client devices 105 can communicate with each other via LAN 120 by use of an open standard protocol 130, such as the Network File System (NFS) protocol. As described below, the open standard protocol 130 may also be other suitable open standard protocols such as the Common Internet File System (CIFS) protocol. The proxy cache 115 and servers 110 can communicate with each other via Wide Area Network (WAN) 125 by use of an open standard protocol 135, such as NFS. By use of an open standard protocol along the WAN 125 and LAN 120, the special software required in conventional approaches is advantageously avoided in an embodiment of the invention. In particular, the clients 105 can now be heterogeneous by use of an open standard protocol such as NFS. In other words, the term heterogeneous clients means that clients from different manufacturers or vendors can be advantageously used. The clients will not require specialized software in order to communicate with the servers 110.

Additionally, the open standard protocol avoids configuration changes that would otherwise be required for the client devices 105 when the proxy cache 115 is installed in the network 100. Thus, a proxy cache 115 permits low overhead and cost with respect to network administration. Also, the proxy cache 115 may be administered or installed from a location remote from a server 110 or a client 105 in the network 100.

Typically, the proxy cache 115 can identify the servers 110 and clients 105 that are coupled to the proxy cache 115 and the particular data files that are in the servers 110.

As an example, if a client 105 requests data and the data is not in the proxy cache 115, then a "cache miss" would occur. On the other hand, if the requested data is in the proxy cache 115, then a "cache hit" would occur. These operations are described in detail below with reference to FIGS. 1B and 1C.

In the event of a cache hit, the proxy cache 115 will transmit the requested data to the requesting client 105. In the event of a cache miss, the proxy cache 115 will request the data from a server 110 and then provide the data to the requesting client 105. The data from the server 110 will be cached as an active data set 140 in the proxy cache 115 and is immediately available to the other clients 105. An active data set is an attribute of clients and their applications, and is cached data with reference for a given time period (or window of time). Thus, the active data set can differ depending on the given time period (e.g., an active data set for a given time period of 2 minutes may differ for an active data set for a given time period of 1 day or 1 week).

The proxy cache 115 permits collaborative sharing of cached copies of data among the clients 105. The collaborative sharing situation assumes that a particular data requested from the server 110 by a client 105 will also be likely requested by at least another client 105.

In an embodiment, the proxy cache 115 will cache an active data set 140, which is a set of recently requested or frequently requested data that has not been flushed from the proxy cache 115. The active data set 140 will be a subset of the data stored in the server(s) 110. When a client device 105 sends a read request 145 in order to read a particular copy 150 of a data file from a server 110, the read request 145 is received by the proxy cache 115 which checks if the particular part (e.g., data block) of that file or folder is cached locally in the proxy cache 115. If the requested particular data file is in the active data set 140, then a cache hit condition occurs, and the proxy cache 115 will transmit the requested data via LAN 120 to the requesting client device 105.

On the other hand, if a data block in the requested file is not stored as part of the active data set, then a cache miss condition occurs. As a result, the proxy cache 115 will send a request 155 to a server 110 to provide a copy of the missing data block in the requested data file.

In an embodiment, the cached file remains as part of the active data set 140, until the file is replaced in the active data set 140 by a suitable replacement strategy (such as, for example, a first-in-first-out management of data or the least recently used, LRU, algorithm). Of course, as described below, other data replacement strategies may be used with respect to management of the active data set 140, in an embodiment of the invention. For example, a file may be designated for permanent storage until a user of the client 105 issues a command to delete (flush) the file from the active data set 140.

Figure 1B:
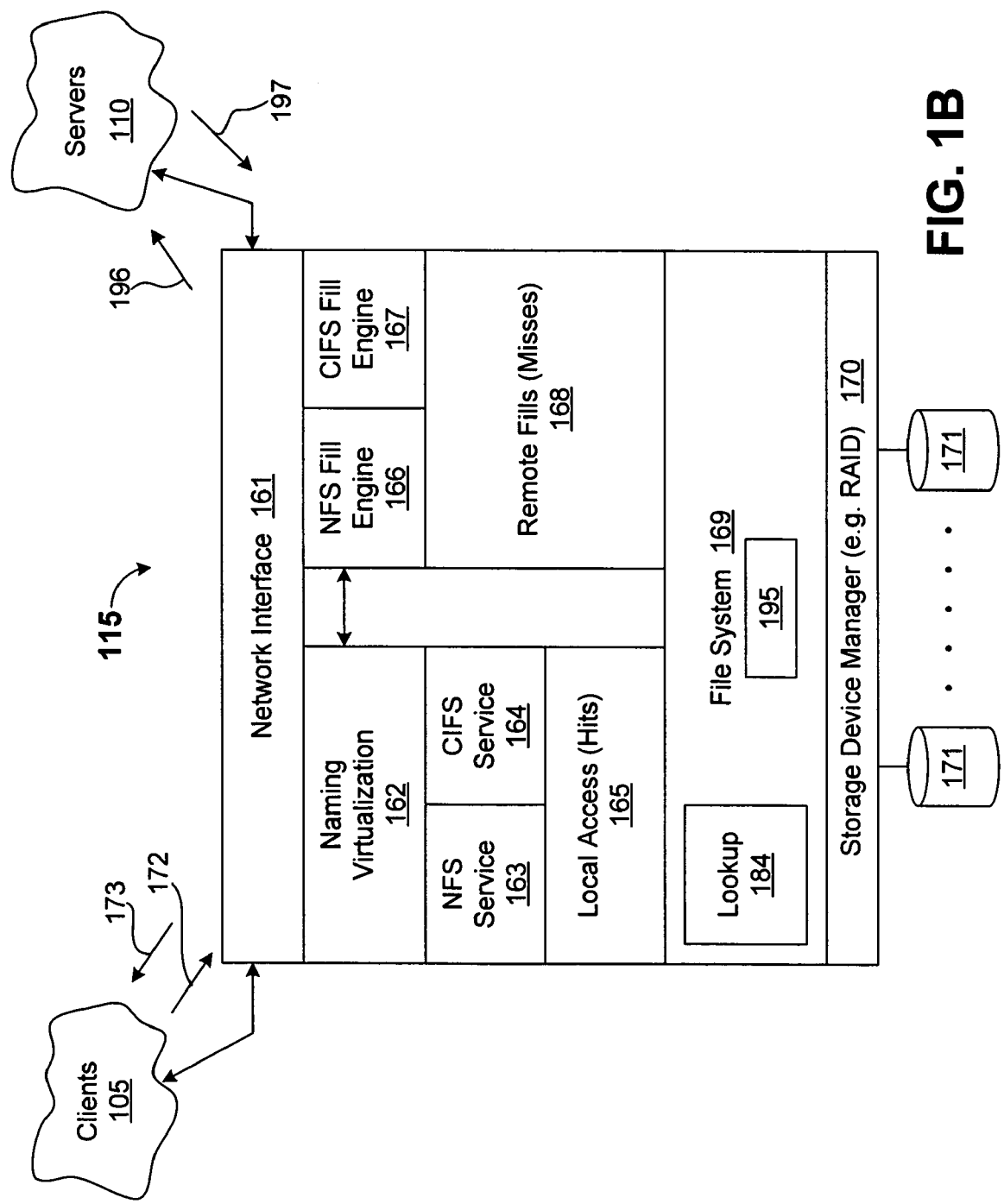
FIG. 1B is a block diagram of a proxy cache in accordance with an embodiment of the invention.

FIG. 1B is a block diagram of a proxy cache 115 in accordance with one embodiment of the invention. The proxy cache 115 includes a network interface 161, a naming virtualization layer 162, an NFS service 163 and/or CIFS service 164 (and/or or other service) for parsing IP-based network traffic (or other types of traffic for fiber channel, storage are network or the like), a local access layer 165, an NFS fill engine 166 and/or CIFS fill engine 167 and/or other suitable types of fill engines, a remote fills layer 168, a file system layer 169 (e.g., write-anywhere-file-layout or WAFL), a storage device manager 170 (such a Redundant Array Of Independent (or Inexpensive) Disks layer, i.e., a RAID layer), and storage disk(s) 171.

The network interface 161 includes components for receiving storage-related service requests from a client 105.

Generally, a file system can logically organize information as a hierarchical structure of directories and files on the storage devices (e.g., disks). Each file (on the disks) may be implemented as a set of disk blocks configured to store information, such as text, whereas the directory may be implemented as a specially-formatted file in which information about other files and directories are stored.

The storage device manager 170 manages the storage devices 171 in a storage system. The storage device manager 170 receives read and write commands from the file system 169 and processes the commands by accordingly accessing the storage system. The storage device manager 170 takes a block's logical address from the file system 169 and translates that logical address to a physical address in one or more storage devices 171 in storage system. In one embodiment, the storage device manager 170 manages storage devices in accordance with RAID (Redundant Array of Independent, or Inexpensive, Disks).

Generally, disk storage is typically implemented as one or more storage "volumes" that is formed by physical storage disks, defining an overall logical arrangement of storage space. Each volume is typically associated with its own file system, and the terms, volume and file system, will generally be used synonymously. The disks within a volume may be typically organized as one or more groups of RAID.

Figure 1C:
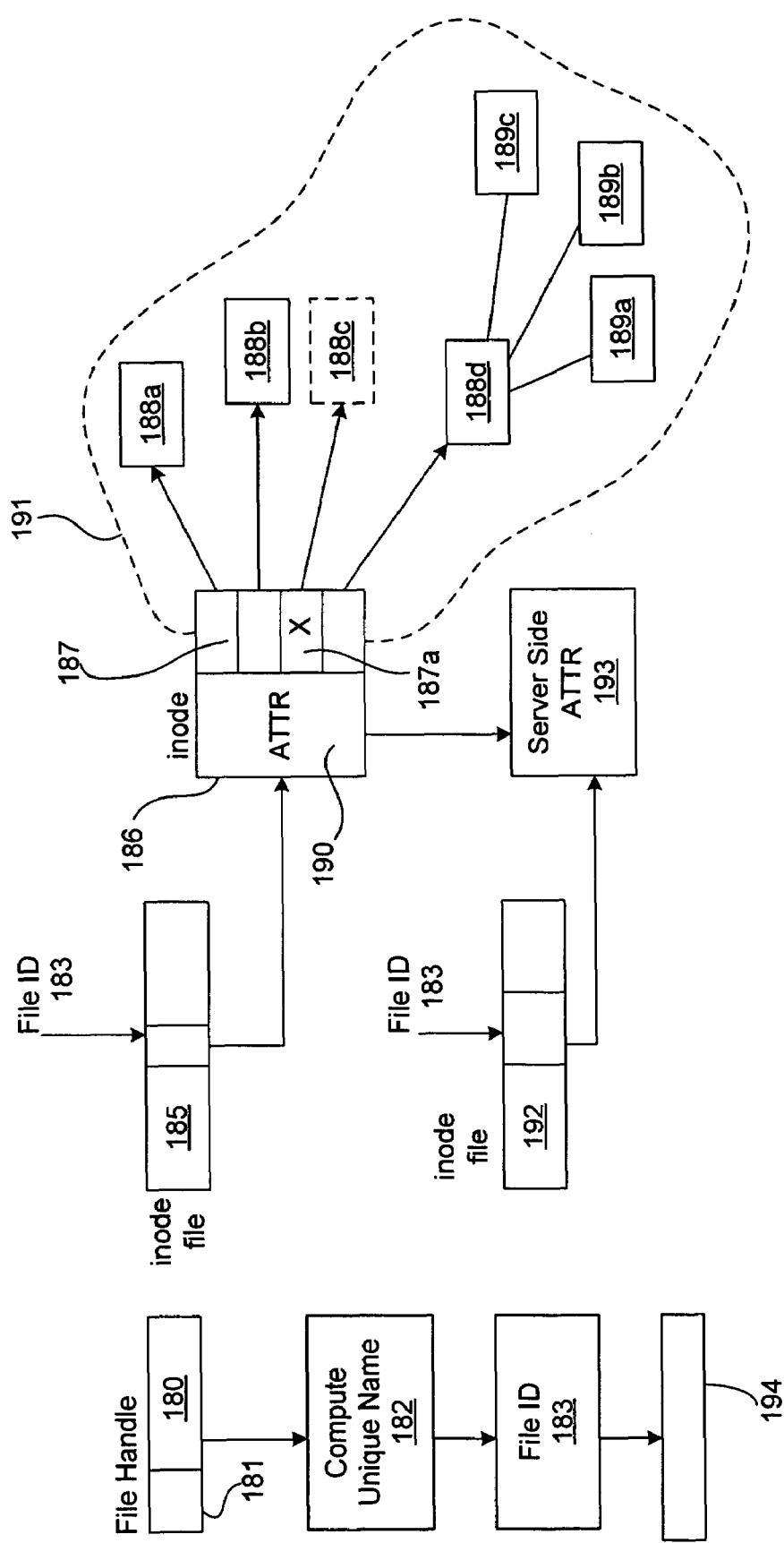
FIG. 1C is a block diagram illustrating a cache hit operation and a cache miss operation.

The functions for the other modules shown in FIG. 1B are described with references to FIG. 1C Cache Hit Reference is now made to the block diagrams in FIG. 1B and FIG. 1C to describe an operation of a proxy cache 115, in accordance with an embodiment of the invention. A file handle is used to name an object such as a file in a file system, and is described in additional detail below in with reference to FIG. 4.

Assume that a read request 172 is received by the proxy cache 115 (FIG. 1B) from a client 105, where the read request includes the file handle 180 having a value of, for example, FH="FILE1 ON CACHE". The network interface 161 will forward the read request to the naming virtualization layer 162, and the virtualization layer will map "FILE1" to a server file handle FH="FILE1 ON SERVER1" on a server 110 with an IP (Internet Protocol) address, 10.56.20.34, for example. Based on the file server identification (FSid) value 181 and the server IP address 10.56.20.34, the local access layer 165 will compute a unique name 182. In one embodiment, the algorithm for computing the unique name is the MD5 hash algorithm, which takes a message and converts it into a fixed string of digits, also called a message digest. It is also noted that the NFS service layer 163 or the CIFS service layer 164 serves the function of parsing the request 172, depending on whether the request is an NFS request or CIFS request.

Based on the unique name 182, the file system layer 169 will perform a lookup function in order to obtain a local cache file ID 183. In an embodiment, a module 184 in the file system 169 can perform this lookup function. If there is no matching local cache file ID, then a cache miss occurs, which is described further below.

The local cache file ID 183 is an index into an inode file 185 that points to an appropriate inode record 186. The inode record for an inode file 105 contains information describing the inode file associated with a given file system. Generally, an inode record is a data structure used to store information, such as metadata (attributes), about a file, whereas the file data blocks are structures used to store the actual data for the file. The information contained in an inode record may include, e.g., ownership of the file, access permission for the file, size of the file, file type and references to locations on disk of the data blocks for the file. The inode record 186 for the inode file 185 contains a pointer to a file system data block (e.g., WAFL data block), generally referenced as 188. A file data block is defined as a minimum addressable amount of data handled by the file system. A file data block is capable of storing, for example, 4 kilobytes (KB) of data. The inode record 186 can also point to indirect blocks which in turn can point to other file data blocks or other indirect blocks. For example, the indirect block 188$d$ points to blocks 189$a$, 189$b$, and 189$c$, each of which may be file data blocks or indirect blocks.

In particular, the inode numbers 187 in an inode record 186 points to the file data blocks or indirect blocks. It is also noted that an inode record 186 also includes attributes 190 of a file stored locally in the proxy cache 115. It is further noted that in one embodiment, the local cache file ID 183 is also an index into a second inode file 192 that points to an appropriate inode record 193 that contains server-side attributes for a file. Server-side attributes can include, for example, file system ID, file ID, block size, number of hard links, and space available on the file system. Of course, the second inode file 192 can be combined with the inode file 185. By creating the second inode file 192, the first inode file 185 will advantageously not require modification to perform some of the functions described with reference to FIG. 1C.

It is also noted that an inode record includes a file buffer tree which is a data structure used to represent a file on a disk in a file system. In FIG. 1C, the file buffer tree 191 is formed by the block numbers 187 and the blocks 188 and 189.

An iovector 194 is then formed, where the iovector is a list of block numbers 187 in the file buffer tree 191. A block number 187 will indicate if a file data block is present or absent for a particular file. In an embodiment, a module 195 can form the iovector 194 and determine the presence or absence of a file data block. In an embodiment, a block number 187 will have a special value X (where X can be, e.g., −1 or −3) as shown by block number 187$a$, where the special value X indicates that the local cache file stored in the proxy cache 115 does not have a requested data block.

In a cache hit condition, a block number will not have the special value X, and the iovector is sent to the storage device manager 170 (e.g., a RAID layer). The storage device manager 170 will provide a pointer to the appropriate storage device(s) 171 and send the requested data block to the file system and to the NFS service (in the case of an NFS request) which creates an NFS response 173 to the requesting client 105. The requesting client 105 can, therefore, receive the requested file. The method described above can also be used to process requests for directories.

The special value X in the list of block numbers permits the tracking of buffers (in the storage devices) in the proxy cache with missing data blocks for a requested file and thus permits the tracking of sparse data. The level of indirection (by calculation of the unique name 182) permits a file handle to point to a different slot in the inode file, depending on the particular time, since a data block or cache file may be flushed from the proxy cache 115.

Cache Miss

When the iovector 194 is constructed, and if a block number 187 in the file buffer tree 191 contains the special value X indicating that the requested file data block is absent from a buffer (in the storage devices 171), then a cache miss condition is triggered. Alternatively, a cache miss condition is triggered if a matching file ID 183 is not found by the file system 169 when performing the table lookup function after computing the unique name 182.

The NFS fill engine 166 for an NFS request 196 (or CIFS fill engine for a CIFS request) will request the absent file data block from the server 110 with the data block. In the example of FIG. 1C, the absent file data block is shown as dashed box 188c. The request is sent by use of the server file handle, "FILE1 ON SERVER1", in the example above.

When the file data block is fetched (197) by the NFS fill engine 166 from the server 110, the data block is filled into the storage disk 171 by the remote fills layer 168, file system 169, and storage device manager 170. The block numbers in the buffer tree 191 is then updated and a file data block is allocated. The file data blocks are then sent to the requesting client 105 so that the requested file is provided to the client. The method described above can also be used to process requests for directories.

It is further noted that the embodiment shown in FIG. 1C permits sparse caching of file data blocks in a buffer tree within one file. This method advantageously permits partial file operations to be performed such as truncating operations or write operations in the middle of the file.

Typically, when a client 105 sends a request in the NFS protocol, a separate request is made for each data block. It is also noted that a separate request in the CIFS protocol is made for each data block. As an example, assume that a first client 105 (e.g., client 105(1) in FIG. 1) sends a request for data in data blocks 188a and 188b, which are both cached in the proxy cache 115 in the example of FIG. 1C. It is noted that the number of request for data from a client may vary. Since the data blocks 188a and 188b are cached in the proxy cache 115 when the client requests were received by the proxy cache 115, as a result, a cache hit condition is triggered, and the requested data blocks 188a and 188b are transmitted to the requesting client 105(1) by the proxy cache 115.

As an example of a cache miss condition, assume that a second client 105 (e.g., client 105(2) in FIG. 1) sends a request for data in data blocks 188a, 188b, and 188c. As noted in the example of FIG. 1C, the data blocks 188a and 188b are cached in the proxy cache 115 when the client requests were received by the proxy cache 115, while the data block 188c is absent from the proxy cache 115. In response to the cache miss condition, the proxy cache 115 will fetch the data block 188c from a server 110, as similarly described above. The fetched data block 188c is allocated in the proxy cache 115 and then transmitted to the requesting client 105(2) by the proxy cache 115.

Assume as a further example that another client 105 (e.g., client 105(n) in FIG. 1) sends a request for data in data blocks 188b and 188c. Since data block 188c was previously fetched by the proxy cache 115 from a server 110 and allocated in proxy cache 115, the data blocks 188b and 188c are present in the proxy cache 115 when the client requests were received by the proxy cache 115. As a result, a cache hit condition is triggered, and the requested data blocks 188b and 188c are transmitted to the requesting client 105(1) by the proxy cache 115. If a client 105 requests for a data block 188 that is absent from the proxy cache 115, then the proxy cache 115 can fetch the absent data block 188 from a server 110 and cache the fetched data block 188 before sending the fetched data block 188 to the requesting client 105.

Thus, replication of a partial object occurs in the proxy cache 115 in response to a client request, where a partial object is defined as one or more blocks of data of a file. In the example above, the data block 188c was replicated in the proxy cache 115 in response to a client request and is subsequently available to other requesting clients 105. As discussed below, suitable data replacement policies may be used to flush (from the proxy cache 115) a data block 188 or a file defined by multiple data blocks 188. In contrast, currently known replication techniques replicate entire files (e.g., entire volumes or entire sets of files are replicated in various mirroring techniques).

Replacement Policies

Figure 2:
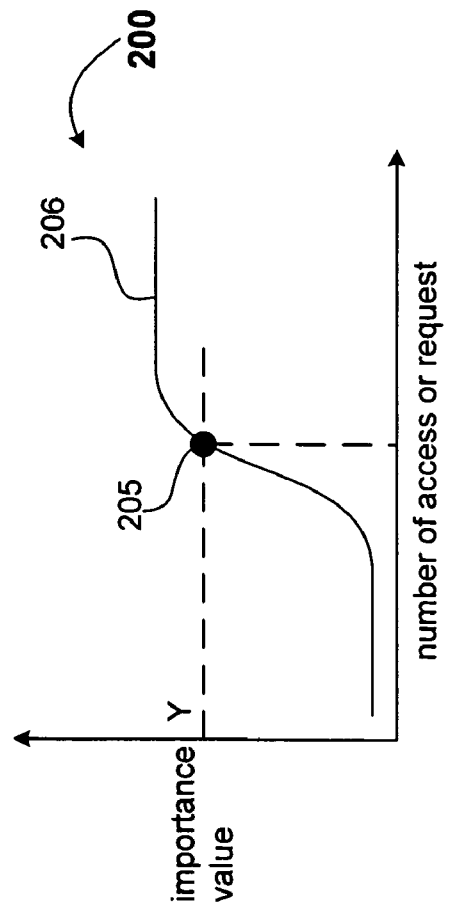
FIG. 2 is a block diagram illustrating a method of managing the active data set by use of an aging scheme or importance scheme, in accordance with an embodiment of the invention.

Various methods may be used as a replacement policy to refresh, retain, or flush data files in the active data set 140 from the proxy cache 114. FIG. 2 is a graph 200 which illustrates a method of increasing the importance of cached data in the active data set 140 based upon the number of access or request for the cached data from a client(s) 105. Thus, the proxy cache 115 can be configured to dynamically assign and adjust an "importance" value to a cached data in the active data set 140 based upon the number of access or request for the cached data from a client 105. As the number of access or request to the cached data increases, the proxy cache 115 will increase the importance value of the cached data. A cached data in the active data set may be prevented from being flushed from the storage unit of the proxy cache 115 if, for example, the cached data attains an importance value Y (as graphically shown by point 205 in the graph of FIG. 2). It is noted that the function 206 in FIG. 2 may have other graphical shapes such as a linear graph.

Figure 3:
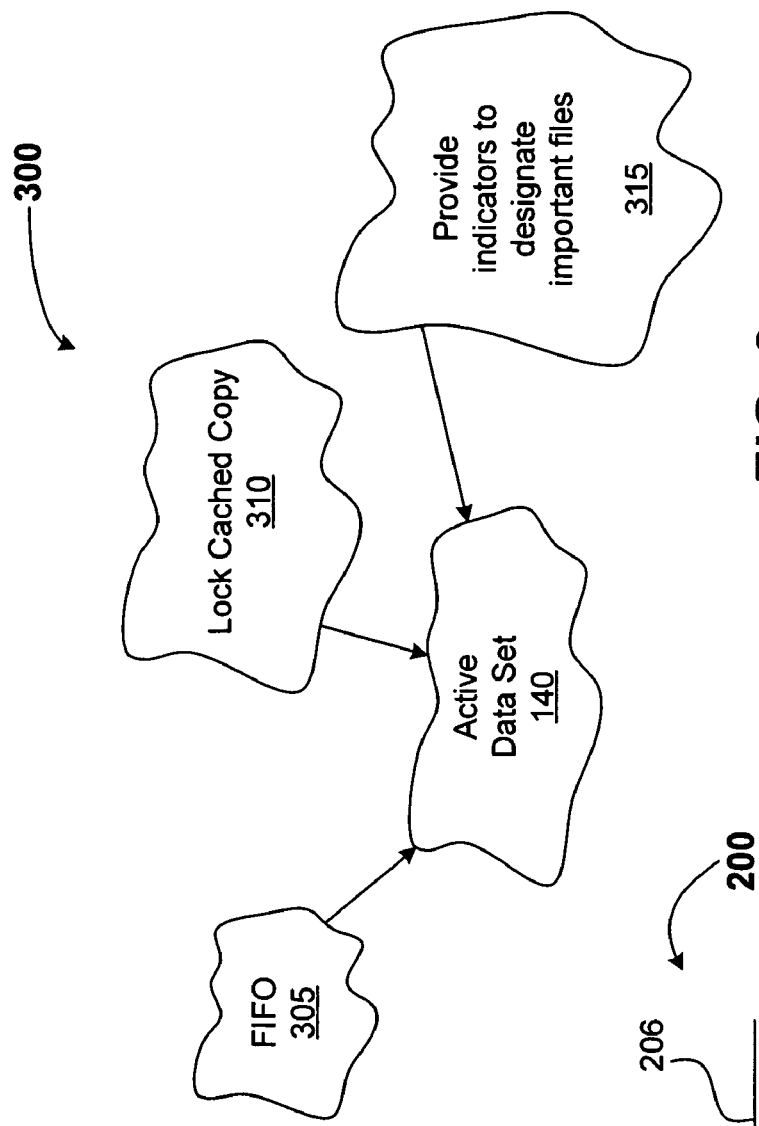
FIG. 3 is a block diagram illustrating other methods for managing the active data set, in accordance with embodiments of the invention.

FIG. 3 is a block diagram illustrating other methods 300 for managing the active data set 140, in accordance with embodiments of the invention. As mentioned above, an active data set 140 may be replaced or flushed from the proxy cache 115 by a suitable method such as first-in-first-out (FIFO) method 305. In the FIFO method 305, the active data set 140 is rotated for flushing from the storage units in the proxy cache 115. Other suitable replacement policies may be used such as the Least Recently Used (LRU) method. LRU refers to a replacement method, typically used in database management systems, where the block that has not been used for the longest time is the first to be replaced.

Alternatively or additionally, a file in the active data set 150 may be locked (310) by a user by sending a lock command to the proxy cache 115 from a client 105, so that the lock command prevents the file from being deleted in the proxy cache. The user may send a lock command if, for example, the user is concerned that the link connection to a server 110 may be broken or that the server 110 may fail. Alternatively, an attribute (metadata) of an object (e.g., file or data block of a file) may indicate how long an object is to remain cached in the proxy cache.

Alternatively or additionally, the user may provide (315) hints or indicators to the proxy cache 115 to designate particular cached files as important. As a result, the indicators will prevent the designated important files from being flushed from the storage unit(s) of the proxy cache 115.

By use of the proxy cache 115, data can be distributed and replicated at various remote locations and advantageously avoid the use of conventional mirroring techniques to replicate data. The use of conventional mirroring techniques requires that entire data sets are mirrored at a pre-determined time or interval (e.g., on a nightly basis) and requires disk spaces for the entire data sets. In contrast, the proxy cache caches 115 replicates data in the active data set 140 on-demand, and the active data set 140 advantageously eliminates the large disk requirements of previous methods for data replication. Additionally, the active data set 140 is automatically updated or flushed in response to a cache miss, and thus eliminates the special software requirements of previous methods for data replication.

Method of Consolidating the Mount Points and Re-Writing/ Mutation of File Handles)

In order to perform operations via the NFS network file system protocol, a client sends NFS requests to the NFS server with: (1) an NFS file handle that specifies the target of the operation, (2) the operation (lookup, read, write, change permissions), and (3) the user on whose behalf the request is sent. When an NFS client wants to access a remote file system for the first time, the client first needs to obtain a root file handle, which is the file handle for an entry point into a volume (as noted above, the term "volume" is synonymous with the term "file system"). To this end, the client host sends a mount request to the server's mount daemon, where the mount request is part of the protocol for accessing a root file handle and a daemon is a program that runs continuously and exists for the purpose of handling periodic service requests that a computer system expects to receive. The daemon program forwards the requests to other programs (or processes) as appropriate. The server's mount daemon verifies that the client has permission to access the requested file system. When the mount daemon grants access, it sends a (directory) file handle back to the NFS client. Typically, the file handles are each, for example, 32 bytes of opaque identifier data. If a file name is changed, the file handle remains the same for that renamed file. Thus, the mounting process described above is a protocol to access a root file handle.

NFS file handles are not globally/universally unique, since two different servers could use the same file handles. Traditionally, this condition is not a problem, as clients keep track of which file handles are associated with each particular server. When a proxy cache 115 is used to consolidate mount points, it may export volumes from many different servers. Since these file handles are not unique, the proxy cache 115 may be unable to determine which file handle corresponds to which origin server, and this condition may result in a collision problem, since a first file in a first specific server and a second file in a second specific server may have identical file handles. The problem is exacerbated since the file handle is defined to be opaque, which means that typically the content of a file handle can not be determined and only the name of the file handle can be obtained.

In an embodiment of the invention, by mutating file handles before sending the file handles to the client 105, the proxy cache 115 is able to interpret file handles and determine the destination server 105 of any file handle. As a result, clients 105 can access data through a proxy cache 115 without an explicit knowledge of the particular server at which the data originates.

As shown in FIG. 4, a file handle 400 includes various fields such as an $FS_{id}$ (file system identifier) field 405, a file identification (ID) field 410, a generation number field 415, and a field 420 for other data. Typically, the $FS_{id}$ field 405 is about 4 to 8 bytes.

An embodiment of the invention allows for the virtualization of server-side file handles. By introducing a proxy cache 115 between clients 105 and servers 110, file handles can be mutated (translated) to allow for the construction of a uniform global name-space. File handles returned to clients can be changed to indicate that they map to different origin servers, different sets of export options, or that they cross mount points. By adding a layer of indirection between the file handle sent to a client and the file handle used to access the object on the origin server, changes to origin servers 110 can made without ever impacting the clients 105.

Figure 6:
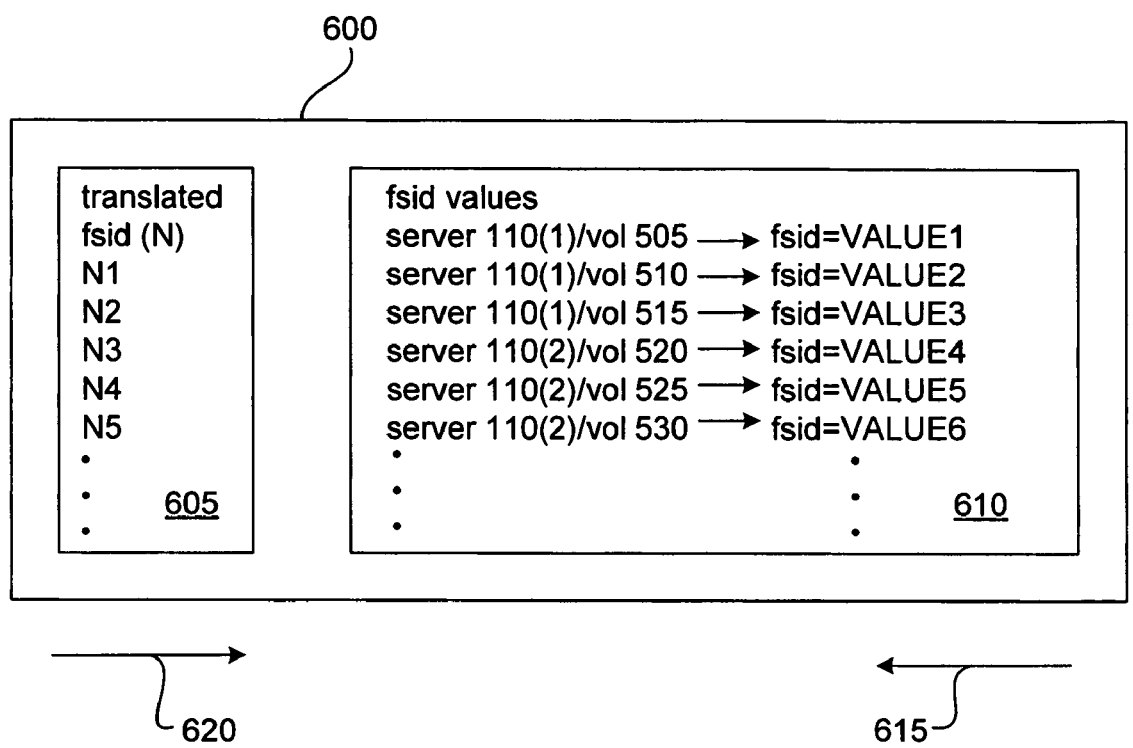
FIG. 6 is a block diagram illustrating a mapping of $FS_{id}$ values for each volume in a particular server, in accordance with an embodiment of the invention.

FIGS. 5 and 6 are diagrams that illustrate a method of consolidating the mount points and method of re-writing or mutation of file handles, in accordance with an embodiment of the invention. As shown in FIG. 5, each server 110 typically includes volumes (e.g., Vol/Vol1, Vol/Vol2, Vol/Vol3), where each volume represents a file system. Thus, the server 110(1) may include volumes 505 to 515, while the server 110(2) may include volume 520 to 530.

As shown in FIG. 6, a mapping 600 of $FS_{id}$ values can be made for each volume in a particular server 110 and the mapping 600 may be stored in the proxy cache 115, in accordance with an embodiment of the invention. The translation of every $FS_{id}$ value beneficially permits a determination of which server stores a particular file in response to a cache miss.

A translation table 605 contains hash values N (e.g., N1, N2, N3, . . . ), while an $FS_{id}$ table 610 contains $FS_{id}$ values for each volumes in the servers 110. When traffic 615 is received from a server 110 with a particular $FS_{id}$ value in the file handle (e.g., volume 505 in server 110(1) with $FS_{id}$=VALUE1 in the example of FIG. 6), then the $FS_{id}$ value=VALUE1 is translated into a translated $FS_{id}$ value N1 in table 605 in the proxy cache 115. Other $FS_{id}$ values from other received file handles from the servers 110 are stored in the table 610 and translated or mutated into different values N in table 605. Thus, when a file handle 620 is received from a client 105 (in the event of a client data request) and a cache miss occurs, then the proxy cache 115 uses the mapping 600 with the N values and the $FS_{id}$ values in table 610 to determine the particular server 110 and file/volume to direct the file handle 620. The translated $FS_{id}$ value N of the file handle 620 is converted by the proxy cache 115 into the appropriate $FS_{id}$ value from table 610 before sending the file handle 620 to the destination server 110.

A value N in table 600 is computed based on some hash that is based on the address of the server 110 with the volume and/or other identifiers. The hash for each N value is unique and thus avoids the name collision problem that was mentioned above. Typically, a value N may be an 8 byte number and may have a value set based on the server name, volume name and file name (e.g., filer1/Vol0/file0).

Alternatively, a value N may be calculated based on the server Internet Protocol (IP) address and the server file handle value by use of the MD5 algorithm as previously described above. Since the file handle value may not be unique across different servers, the server IP address can make each value of N distinct for files across different servers.

Figure 7:
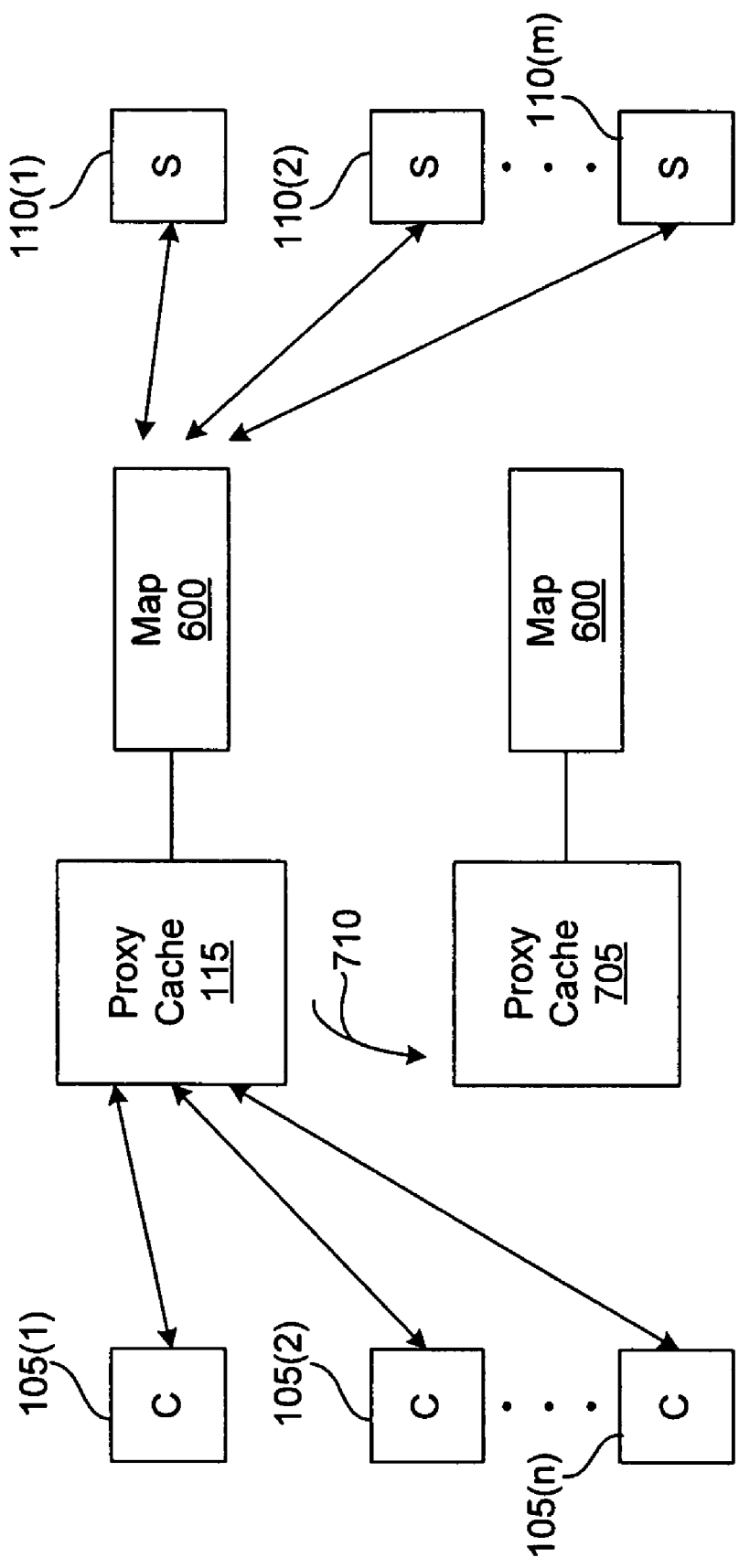
FIG. 7 is a block diagram of a network system including multiple proxy caches with identical mapped file handles, in accordance with an embodiment of the invention.

As shown in FIG. 7, the mapping 600 can be duplicated in various proxy caches (e.g., proxy caches 115 and 705). As a result, the mapping 600 will be available from other proxy caches if a particular proxy caches fails. For example, if clients 105 are no longer able to access the proxy cache 115 due to device failure, then a fail-over 710 can be performed to the proxy cache 705 so that the clients 105 can access the proxy cache 705 with the mapping 600 for re-writing of the file handles 400

Additionally or alternatively, since the mapping 600 can be duplicated into multiple proxy caches, a proxy cache (e.g., proxy cache 115) can be swapped with a new or another proxy cache (e.g., proxy cache 705) without requiring clients 105 to un-mount and re-mount their volumes and without requiring other changes in the clients 105.

Method of Creating and Using a Virtual Global Name Space

In addition to allowing for the consolidation of mount points as described above, an embodiment of the invention also provides for the creation of a uniform global namespace. Traditionally, NFS mount points can not be nested (i.e., if a client mounts an NFS volume, then that volume can not contain other mount points). This limitation makes the creation of a uniform view of a network very difficult.

Using virtualization of file handles in accordance with an embodiment of the invention, administrators can configure arbitrary directories in NFS exported volumes as mount points (access points to a file system). This means that clients 105 only need to mount one volume, but when they access this volume, the proxy cache will properly redirect the client requests to the particular appropriate volume. Thus, a proxy cache 115 can inform every client 105 about each server 110 (or new added server) by use of a single mount point. By renaming objects, a virtual global view of the files (i.e., virtual global name space) is created, and as a result, each client 105 has information about each server 110 and about each file in each server 110 by use of the virtual global view of the files. The virtual global name space leads to ease in administration of the clients 105.

Figure 8A:
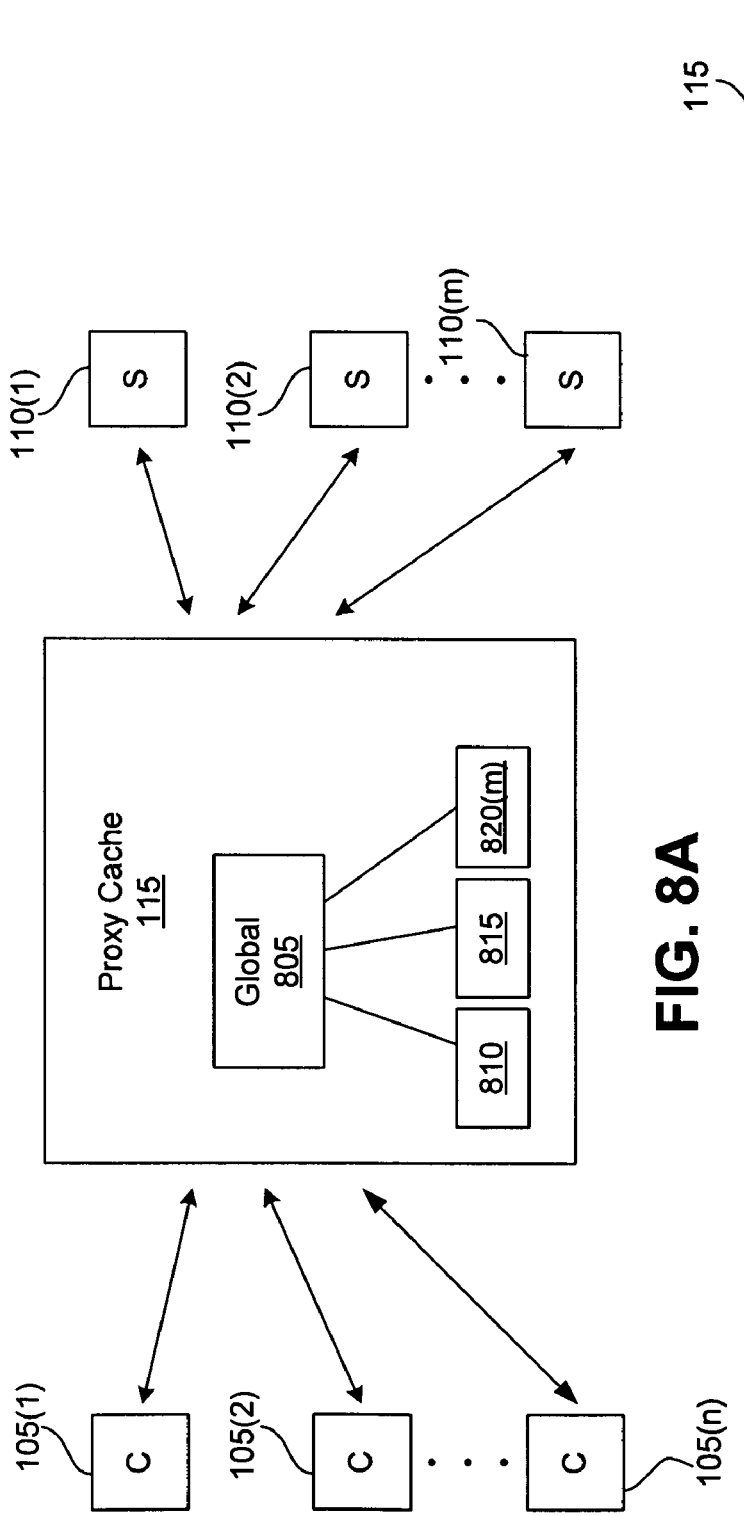
FIG. 8A is a block diagram illustrating a local directory for permitting a virtual name space, in accordance with an embodiment of the invention.

As shown in FIG. 8A, multiple clients 105 can access a volume name 805 (in the proxy cache). An example volume name can be, "/global". The volume name 805 permits a virtual name space in accordance with an embodiment of the invention. A client 105 can mount the volume name 805 and view folders 810, 815, 820m associated with the servers 110(1), 110(2), and 110(m), respectively. Each folder 810, 815, and 820m will contain volume names assigned to particular servers. Thus, the volume name 805 points to server110(1)/vol505, server110(1)/vol510, server110(1)/vol515, server110(2)/vol520, server110(2)/vol525, server110(2)/vol530, and to other known volumes in the servers 110. Therefore, the folders 805–820m are virtually mapped to the mount point via volume name 805. The clients need only know about a single mount point (e.g., global) to access the appropriate servers 110. The mapping 600 (see FIG. 6) is used to permit the file handles 400 to be virtual access points into volumes of servers 100, along with the re-writing of file handles in the NFS protocol. As mentioned above, the mount process involves communicating with the server to get the root file handle for the file system, which can later be passed to the lookup Remote Procedure Call (RPC) to locate other file handles in the remote file system directory hierarchy.

An advantage permitted by the single mount point is that the clients 105 need not be aware of every single mount points. In previous approaches, each client typically has an FStab file (file system table file), which lists all known remote file systems in folders (i.e., FStab is a list of local directories or folders in a client where the client can access a driver and server name and volume name). If a change occurs in a server 110, where the change affects the name space, then each client 105 will be required to be reconfigured so that the clients are able to access the servers, resulting in the complicated and time consuming mount point management tasks of the previous approaches.

In an embodiment of the invention, each client will only need to mount the directory 805 and this single consolidated mount point leads to simplified mount point management. In particular, the mount point is un-mounted and mounted on the proxy cache 115, and as a result, the volume name 805 will not require un-mounting and re-mounting on the clients 105. Thus, the directory 805 provides the function of a file system table file where clients can access drivers and servers. The directory 805 provides a list of access points to remote file systems and associated attributes as stored in a remote server(s) 110.

Method of Creating Multiple Mount Points where a Set of Attributes are Associated with a Mount Point.

A file handle can be re-written in different ways for the same object. In an embodiment, a file handle can be re-written in different ways based upon attributes of the associated local mount point on the proxy cache.

Figure 8B:
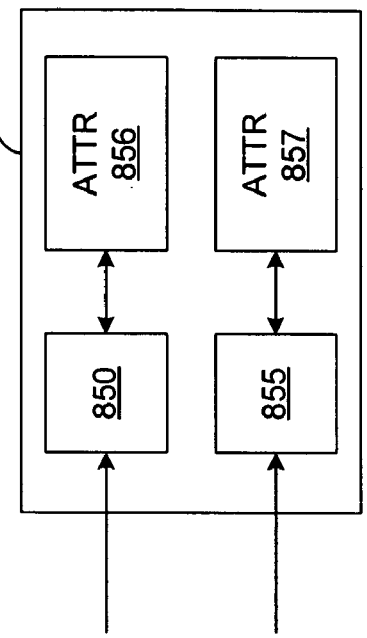
FIG. 8B is a block diagram illustrating a method of creating multiple mount points where a set of attributes are associated with a mount point.

Reference is now made to FIG. 8B. A mount point is defined as a local volume name. As an example, the local volume name, user/read-only/employee1 (see block 850) and local volume name, user/employee1 (see block 855) will each yield two different file handles because the mount point for each local volume name differs. In particular, the mount point of user/read-only/employee1 850 is "user/read-only", while the mount point of user/employee1 855 is "user".

A local volume name can have associated attributes or meta-data such as access restrictions, eligibility for storage or cacheability, security attributes, authentication, and authorization levels for proxy cache devices, as well as read-only or write-only attributes for servers. The attribute associated with the same data can be changed by accessing a mount point associated with another volume that shares the same data. Thus, particular attributes can be associated with a particular mount point or access point, which can be hashed to form a unique identifier. In an embodiment of the invention, the unique identifier is a hashing of a local volume name, file system ID, and server IP address by use of a suitable hashing algorithm such as MD5. In the example of FIG. 8B, the attribute(s) 856 is associated with the mount point 850, while the attribute(s) 857 is associated with the mount point 855.

It is further noted that the same physical object on disk in the proxy cache 115 can be accessed from the different mount points.

Figure 9:
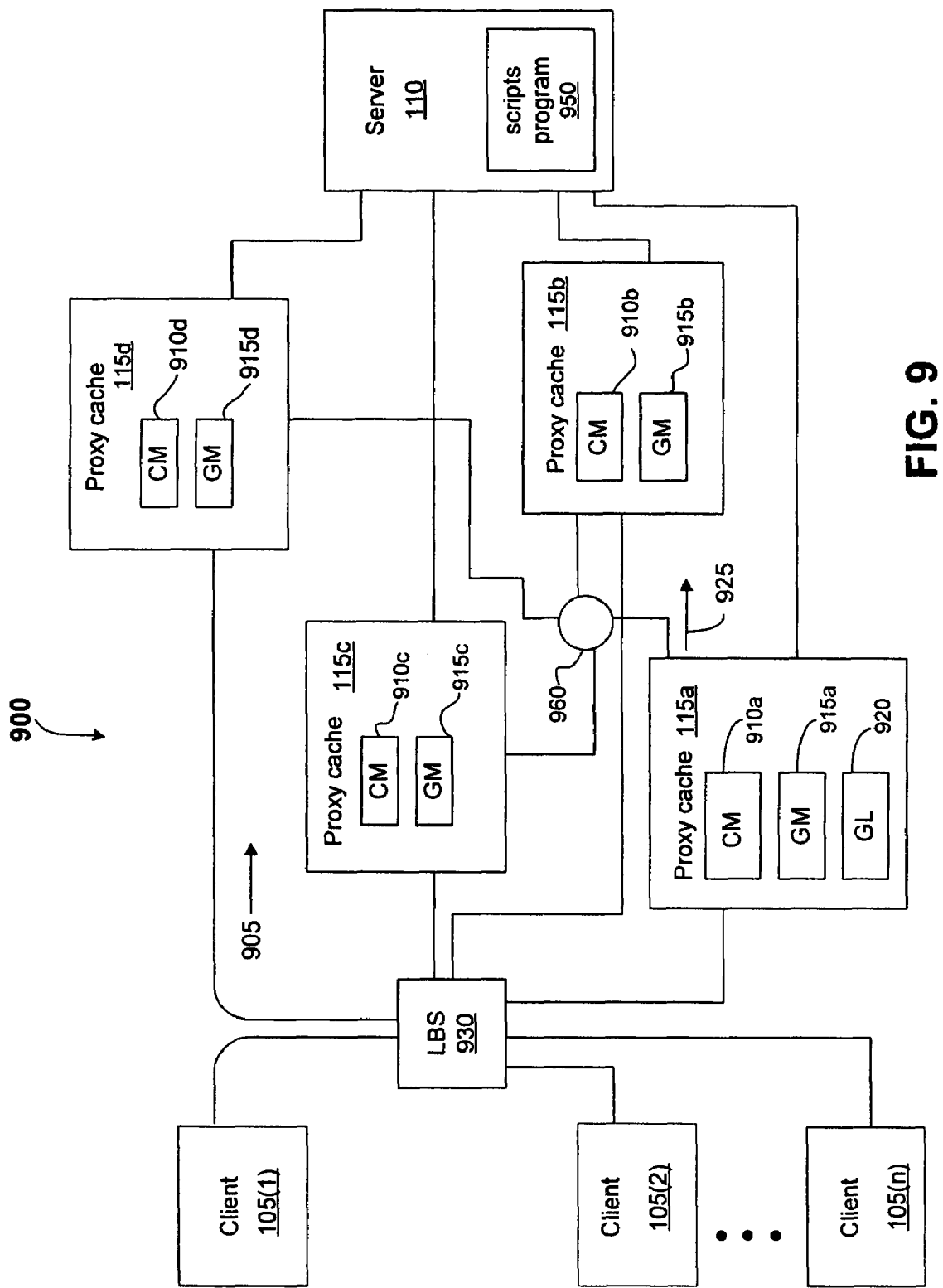
FIG. 9 is a block diagram illustrating a network with a cluster configuration of proxy caches, in accordance with an embodiment of the invention.

FIG. 9 is a block diagram illustrating a network 900 with a cluster configuration 905 of proxy caches 115a–115d, in accordance with an embodiment of the invention. The number of proxy caches 115 in the cluster configuration 905 may vary in number. Each proxy cache 115 includes a control manager module (which is generally referred herein as control manager module 910) and a group member module (which is generally referred herein as group member module 915). For example, the proxy cache 115a includes the control module 910a and the group member module 915a. The components in a proxy cache 115 interact with the proxy cache operating system (see FIG. 1B) and with the proxy cache processor. The control modules and group modules for other proxy caches 115 in the cluster configuration 905 is shown in FIG. 9. The functions of the control modules 910 and group member modules 915 are discussed in detail below.

In the example of FIG. 9, the proxy cache 115 also includes a group leader module 920. However, the group leader module 920 may be placed in other devices, such as, for example, in one of the proxy caches 115b–115d or in the server 110.

The control manager module 910 provides the firmware and user interface that permits a network administrator to set configuration options in a proxy cache 115. In an embodiment, the control manager module 910 includes a registry for storing the configuration options, and a GUI (graphical user interface) and command lines to permit the network administrator to set the configuration options. For example, control manager module 910a is used to set a schedule for transmitting (pushing) the file system data 925 from the proxy cache 115a to, for example, the designated proxy caches in the cluster 905. In the example of FIG. 9, the designated proxy caches are assumed to be proxy caches 115b–115d. The file system data 925 may be a data object of a suitable size. Typically, the data object is, for example, a data block, a data file, or a folder. Additionally, the control manager module 910a can be used to immediately push the file system data 925 from the proxy cache 115a to the designated proxy caches 115b–115d in the cluster configuration 905.

The control manager module 910a is used to configure the group member module 915a so that the proxy cache 115a is configured to belong in the cluster configuration 905. The group member modules 915 in the other proxy caches are also configured (by their associated control manager module 910) so that the other proxy caches are configured to belong in the cluster configuration 905. Therefore, the proxy cache 115a is aware, based on the settings in its group member module 915a, that the other proxy caches 115b–115d are also member in the cluster configuration 905.

The control manager module 910a is used to configure the group member module 915a so that the group member module 915a can identify the group leader module 920. The group member modules 915 in the other proxy caches are also configured (by their associated control manager module 910) for purposes of identifying the group leader module 920.

The control manager module 910a (in proxy cache 115a) is used to designate the particular proxy caches that will receive the data 915 from the proxy cache 115a. In the example of FIG. 9, the control manager module 910a has been configured so that the proxy caches 115b–115d have been designated to receive the data 915 from the proxy cache 115a. However, the control manager 910a may also be configured so that a lesser number of proxy caches (e.g., proxy caches 115b–115c) or a greater number of proxy caches are designated to receive the data 915 from the proxy cache 115a.

The control manager module 910a is also used to designate the type of data 915 that will be pushed from the proxy cache 115a to the designated proxy caches 115b–115d. For example, the data type may be standard text, image, and audio documents, web content, streaming audio content, and/or video content, and/or other suitable types of data.

The control manager module 910a will communicate with the group leader module 920, and the group leader module 920 will contact the group member modules 915 in the designated proxy caches 115b–115d that have been designated in the control manager module 910a to receive the data 915. For example, assume that the network administrator designates (in the control manager module 910a) the proxy caches 115b–115d to receive the data 925 from the proxy cache 115a. The group leader module 920 then contacts and coordinates with the group member modules 915b, 915c, and 915d (in the designated proxy caches 115b, 115c, and 115d, respectively) so that the data 925 is transmitted to and is received by the designated proxy caches 115b, 115c, and 115d.

The proxy cache 115a will transmit the data 925 to the designated caches 115b–115d by use of a standard point-to-point protocol (e.g., data transmission over Transmission Control Protocol (TCP) or User Datagram Protocol (UDP)). Alternatively, the proxy cache 115a will transmit the data 925 to the designated proxy caches 115b–115d by use of a multicast protocol if the network 900 can support the multicast protocol. The type of protocol to use for transmitting the data 925 to the designated caches 115b–115d in the cluster configuration 905 can be selected by use of the control manager module 910a.

The proxy caches 115a–115d can typically communicate with each other via network switch 960, which is typically implemented in a local area network that supports the proxy caches 115a–115d.

When the data 925 is received by the designated caches 115b–115d, the designated proxy caches 115b–115d can then cache the data 925 and serve the cached data 925 to a subsequently requesting client 105. For example, in FIG. 9, a plurality of clients 105(1) to 105(n) are coupled to a load balancing switch (LBS) 930 and can send requests to any one of the caches 115a–115d in the cluster configuration 905 to obtain the data 925. Any of the proxy caches 115a–115d that is selected by the LBS switch 930 can then direct the client request to a selected one of the proxy caches 115a–115d and the selected proxy cache can then serve the data 925 to the requesting client 105.

In another embodiment, the LBS switch 930 can load balance traffic from the clients 105 to the proxy caches 115, where the BS switch 930 will select a destination proxy cache 115 for client traffic by use of round-robin selection.

Figure 10:
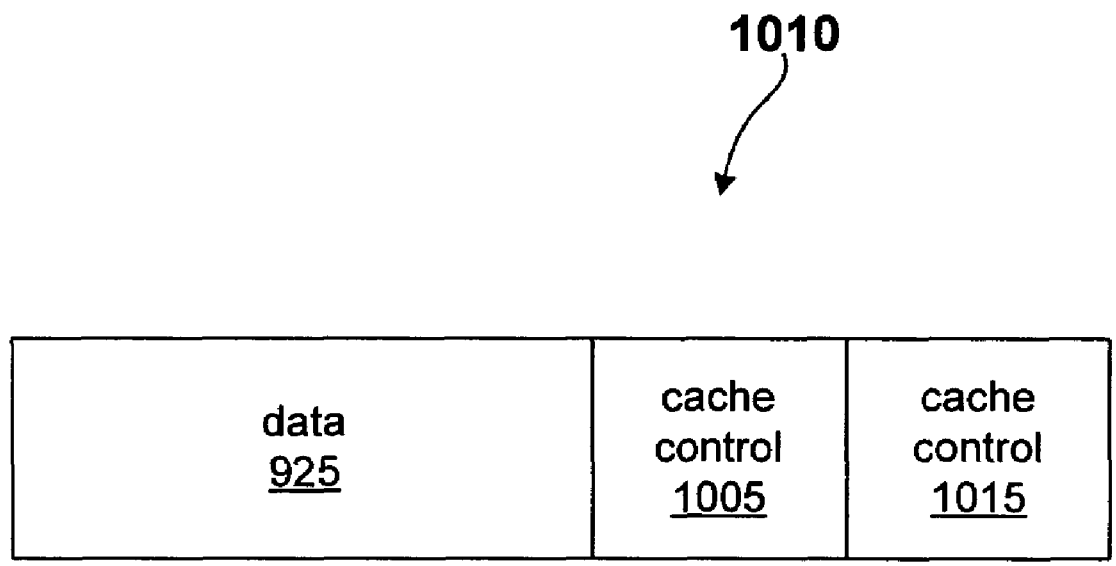
FIG. 10 is a block diagram illustrating headers in data transmitted in a cluster configuration of proxy caches, in accordance with an embodiment of the invention.

In an embodiment of the invention, the network administrator can designate the time period for each of the designated caches 115b–115d to lock in a received data 925 from the distributing proxy cache 115a, as an option. The received data 925 will not be flushed from a receiving proxy cache for a time period specified by the lock. As shown in FIG. 10, a cache control lock timeout header 1005 (in a transmitting packet 1010 with the data 925) will indicate the time period in which each of the receiving designated proxy caches 115b–115d will store (and not flush) the data 925. The header 1005 is saved as an attribute (meta-data) in each of the designated proxy caches 115b–115d, and the proxy cache operating system (FIG. 1B) in each of the designated proxy caches 115b–115d will not flush their associated cached data 925 until the time period indicated in the header 1005 expires. The proxy cache operating system compares the time value indicated in the header 1005 with the current time value, in order to determine if the cached data 925 will be eligible for flushing in any one of the designated proxy caches 115. The time period for locking the data 925 is set in the control lock timeout header 1005 by the network administrator via the control manager module 910a.

In an embodiment of the invention, the network administrator can designate the time period for each of the designated caches 115b–115d to prevent a received data 925 from the distributing proxy cache 115a to be shown to a requesting client by each of the receiving designated proxy caches 115b–115d, as an option. As shown in FIG. 10, a minimum age header 1015 (in a transmitting packet 1010 with the data 925) will indicate the time period in which a receiving designated proxy cache 115 will prevent the associate data 925 from being served to a requesting client 105. The header 1015 is saved as an attribute (meta-data) in each of the designated proxy caches 115b–115d, and the proxy cache operating system (FIG. 1B) in each of the designated proxy caches 115b–115d will not serve the cached data 925 from each of the designated proxy caches 115b–115d until the time period indicated in the header 1015 expires. The proxy cache operating system compares the time value indicated in the header 1015 with the current time value, in order to determine if the cached data 925 can be served from any of the designated proxy caches 115b–115d to a requesting client 105. The time period (minimum age) in which the cached data 925 is not served to a requesting client 105 is set in the minimum age header 1015 by the network administrator via the control manager module 910a.

When one of the clients 105(1) to 105(n) sends a write request for an object in one of the proxy caches 115a–115d, the proxy cache that receives the write request will then send the modified object to the server 110 to update the stored copy of the object in the server 110.

In an embodiment, the transmitted data 925 may be, for example, data that is frequently requested from clients 105. For example, a scripts-based program 950 may be implemented in the server 110 to determine latencies for request for objects (e.g., files) in a proxy cache 115. It is noted that the scripts-based program 950 may be implemented, alternatively, in one of the proxy caches 115a–115d, in one of the clients 115, in a router or switch in the network 900, or in other suitable devices in the network 900. A longer latency period, in order to respond to a client request for an object, can indicate that a particular object in a proxy cache 115 is receiving a higher number of client requests.

Objects that are requested frequently can be transmitted as data 925 to the designated proxy caches 115b–115d in the network 900. The frequently requested object is then available to be served by the proxy caches 115a–115d to subsequently requesting clients 105.

Fail-Over Operation in the Cluster Configuration

As shown in FIG. 9, the cluster configuration 905 of proxy caches 115 permits a method of an alternate route for client request traffic and data traffic if the primary proxy cache fails. The proxy caches 115a–115d may be, for example, in different parts of the world or region. For example, if the proxy cache 115a is the primary cache and subsequently fails, then an alternate route for network traffic may be formed by selecting another proxy cache in the cluster configuration 905 to serve the client request. For example, the LBS switch 930 can direct traffic away from the failed proxy cache 115a and toward the other proxy caches 115b–115d.

The LBS switch 930 can also perform a load balancing function to minimize latencies in the network 900. For example, if the proxy cache 115a is being accessed by client 105(1), then the LBS switch 930 can direct a request by client 105(2) to another proxy cache (e.g., proxy cache 115b) which may not be currently serving another client request. As a result, the latency associated with the response to the request from client 105(2) is minimized.

Multiple Servers Configuration and Snapshot Mirroring

Figure 11:
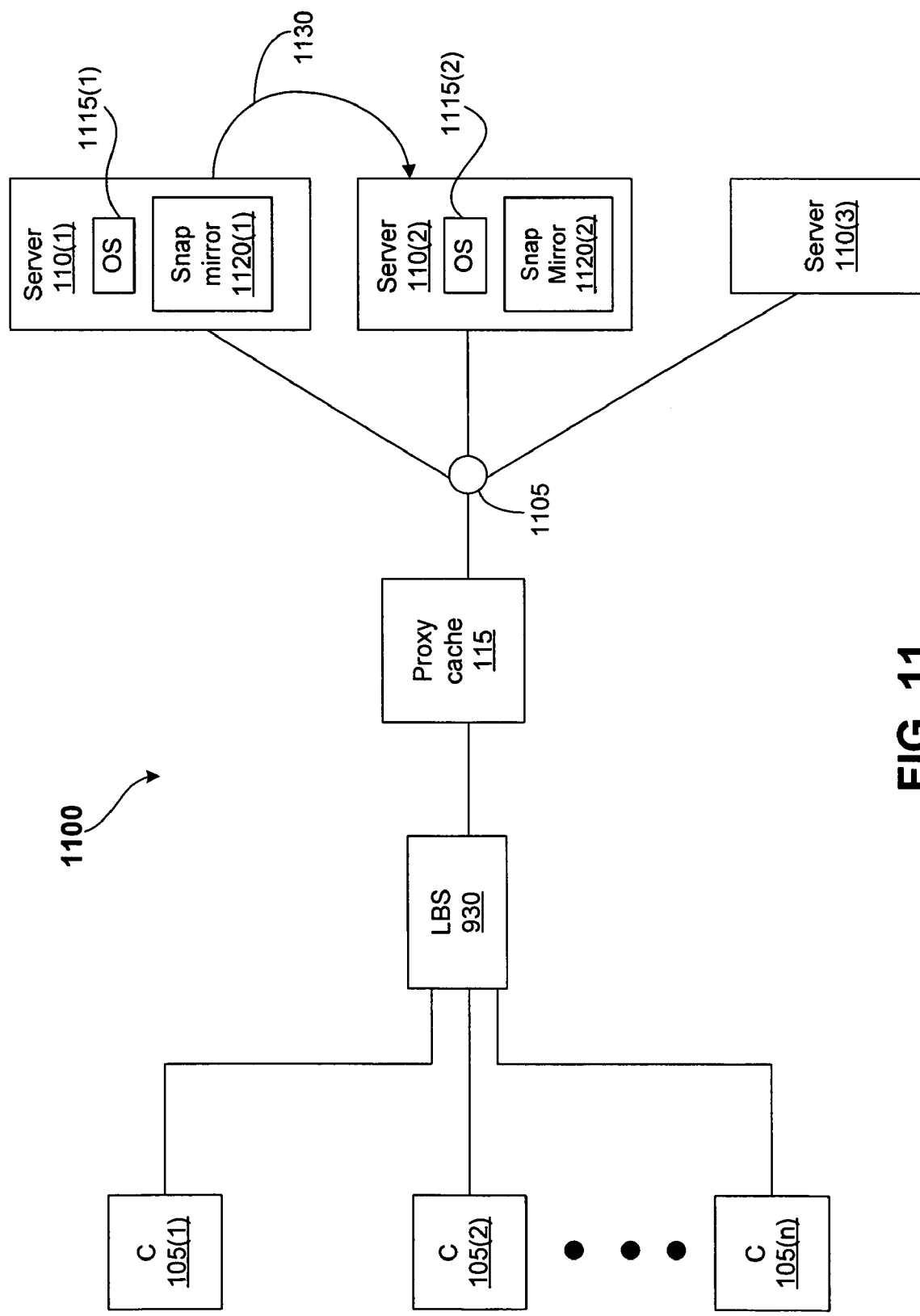
FIG. 11 is a block diagram illustrating a network with multiple servers coupled to a proxy cache, in accordance with an embodiment of the invention.

FIG. 11 illustrates a network 1100, including a proxy cache 115 coupled to multiple servers 110(1) to 110(3), in accordance with an embodiment of the invention. In the network 1100, only one client (e.g., client 105(1) may be implemented and the number of multiple servers 110 may also vary. If only one client 105 is implemented in the network 1100, then the load balancing switch 930 is omitted. The proxy cache 115 can typically communicate with each server 110(1)–110(3) via network switch 1105, which is typically implemented in a local area network that supports the proxy cache 115 and servers 110(1)–110(3).

As an example, the server 110(1) can provide a snapshot of a file system in the server 110(2) to the server 110(2) or to the server 110(3). Generally, a snapshot is an image (typically read-only) of a file system at a point in time, where the image is stored on the primary storage device as is the active file system and is accessible by users of the active file system. An "active file system" is the file system to which current input/output operations are being directed. A primary storage device (e.g., disks) stores the active file system, while a secondary storage (e.g., tape drive) may be utilized to store backups of the active file system. The snapshot version of the image is available for possible disaster recovery. Snapshots are generally created-on some regular schedule.

The server 110(1) includes a storage operating system 1115(1) and a snapshot mirroring application 1120(1). A processor in the server 110(1) executes the operating system 1115(1) and snapshot mirroring application 1120(1) so that automated file system replication of a volume is performed from server 110(1) to another server (e.g., server 110(2) in the FIG. 11 example). The snapshot mirroring application 1120(1) scans the memory of the server 110(1) for snapshots and transmits the snapshot replica 1130 to a destination server (server 102(2) in the example of FIG. 11). A snapshot mirroring application 1120(2) on the destination server 110(2) processes and stores the received snapshot replica 1130 into the destination server. The snapshot mirroring application 1120(2) and storage operating system 1115(2) in the server 110(2) are executed by a processor. Additional details on the snapshot mirroring procedure are described in U.S. patent application Ser. No. 10/100,967, entitled "SYSTEM AND METHOD FOR DETERMINING CHANGES IN TWO SNAPSHOTS AND FOR TRANSMITTING CHANGES TO A DESTINATION SNAPSHOT", by Michael L. Federwisch et al., which is hereby fully incorporated herein by reference, and in "TR3002 File System Design for an NFS File Server Appliance", by David Hitz, et al, published by Network Appliance, Inc., Sunnyvale, Calif., which is hereby fully incorporated herein by reference.

When a snapshot replica 1130 of a snapshot is created in the server 110(2), the data and metadata including inode information), of when the image is taken, is included in the snapshot replica 1130. Therefore, the file handle sent by a client 105 to the server 110(1) for an access request to a file or volume in the snapshot, can also be sent to the server 110(2) to access the snapshot replica 1130.

In an embodiment of the invention, the proxy cache 115 can use the server 110(1) as source of cached data and the server 110(2) as a secondary source of cached data. The snapshot replica 1130 permits the server 110(2) to store data that mirrors data that is stored in the server 110(1).

In an embodiment of the invention, assume that the snapshot replica 1130 has been copied into the server 110(2). Assume further that the server 110(1) fails or goes offline. If the client 105(1) sends an access request for a file that is in the snapshot (and snapshot replica 1130) and if the file is not cached in the proxy cache 115, then a cache miss condition will occur. The proxy cache 115 can then obtain, from the server 110(2), the file requested by the client 105. The proxy cache 115 can then send the file to the requesting client 105. Therefore, the snapshot mirroring procedure permits a failover operation to another server that the proxy cache 115 can access if a cache miss were to occur for a file that is in the snapshot replica 1130. The failover operation to the second server 110(2) can occur if, for example, the first server 110(1) is disconnected from the proxy cache 115 by server failure or network failure.

Figure 12:
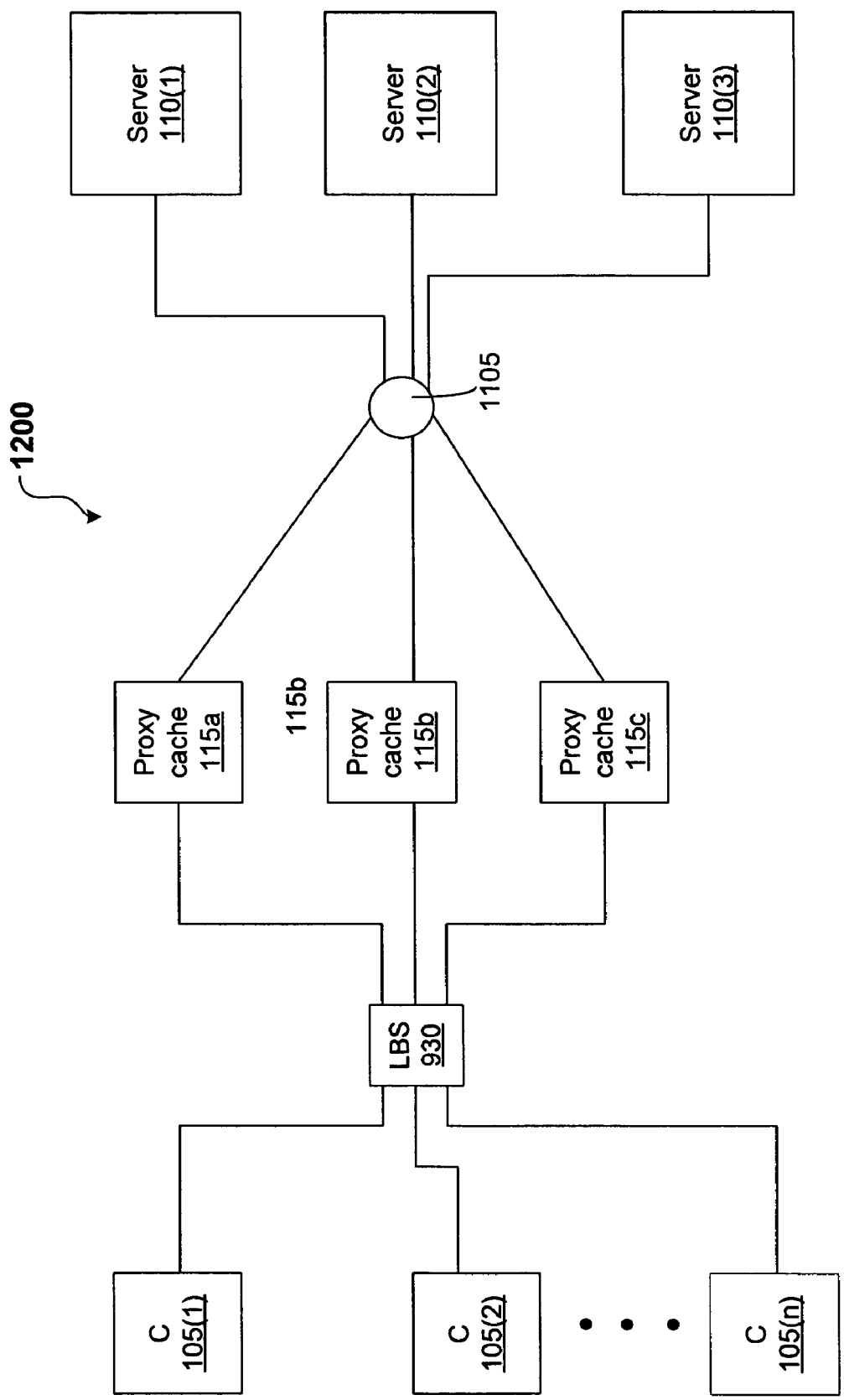
FIG. 12 is a block diagram illustrating a network with multiple servers coupled to multiple proxy caches, in accordance with an embodiment of the invention.

FIG. 12 is a block diagram of a network 1200 in accordance with another embodiment of the invention. The proxy caches 115a–115c can communicate with a plurality of servers 110(1)–110(3) via network switch 1105, for example. The number of servers 110 and proxy caches 115 in the network 1200 may vary. Thus, the proxy caches 115a–115c permit the scaling or distribution of traffic to and from the plurality of servers 110(1)–110(3) and permit traffic acceleration to and from the servers 110(1)–110(3). The reverse proxy configuration in FIG. 12 prevents the servers 110(1)–110(3) from acting as a bottleneck to client traffic, particularly if the servers are of slower processing capability. The data in the servers 110(1)–110(3) can be consistent and identical by use of the snapshot mirroring technique. Therefore, when one of the clients 105(1)–105(n) sends an access request for an object that is not cached in any of the proxy caches 115a–115c, then the proxy cache that receives the client access request can send a request for the object to one of the servers 110(1)–110(3), as determined by the network switch 1105, and obtain and cache the requested object. The proxy cache can then serve the fetched object to the requesting client.

Virtualization of Naming

As mentioned above, in an embodiment of the invention, by mutating file handles before sending the file handles from the proxy cache 115 to the client 105, the proxy cache 115 is able to interpret file handles and determine the destination server 105 of any file handle. As a result, clients 105 can access data through a proxy cache 115 without an explicit knowledge of the particular server at which the data originates.

As also mentioned above, to uniquely identify files in multiple servers, a file handle that is returned to a client 105 is mutated by computing a unique name based upon, for example, the server IP address of the server storing the file. Therefore, the particular originating server for a file can be determined by the proxy cache 115 by use of mapping 600 in FIG. 6.

The mapping 600 of $FS_{id}$ values, as shown in FIG. 6, can be made for each volume in a particular server 110 and the mapping 600 may be stored in the proxy cache 115, in accordance with an embodiment of the invention. The translation of every $FS_{id}$, value beneficially permits a determination of which server stores a particular file in response to a cache miss, particularly if multiple servers are implemented in the network. The translation table 605 contains hash values N (e.g., N1, N2, N3, . . . ), while an $FS_{id}$ table 610 contains $FS_{id}$ values for each volumes in the servers 110. When traffic 615 is received from a server 110 with a particular $FS_{id}$ value in the file handle (e.g., volume 505 in server 110(1) with $FS_{id}$=VALUE1 in the example of FIG. 6), then the $FS_{id}$ value=VALUE1 is translated into a translated $FS_{id}$ value N1 in table 605 in the proxy cache 115. Other $FS_{id}$ values from other received file handles from the servers 110 are stored in the table 610 and translated or mutated into different values N in table 605. Thus, when a file handle 620 is received from a client 105 (in the event of a client data request) and a cache miss occurs, then the proxy cache 115 uses the mapping 600 with the N values and the $FS_{id}$ values in table 610 to determine the particular server 110 and file/volume to direct the file handle 620. The translated $FS_{id}$ value N of the file handle 620 is converted by the proxy cache 115 into the appropriate $FS_{id}$ value from table 610 before sending the file handle 620 to the destination server 110.

The mapping 600 can be stored in multiple proxy caches 115, such as the plurality of proxy caches 115a–115c in FIG. 12. Therefore, if one proxy cache fails, then failover can be performed to another proxy cache, and the appropriate server can be accessed to fetch an object, based on the use of the mapping 600. Furthermore, a proxy cache can be swapped out with a new proxy cache (with mapping 600) without requiring the clients 105 to unmount and re-mount their volumes.

Figure 13:
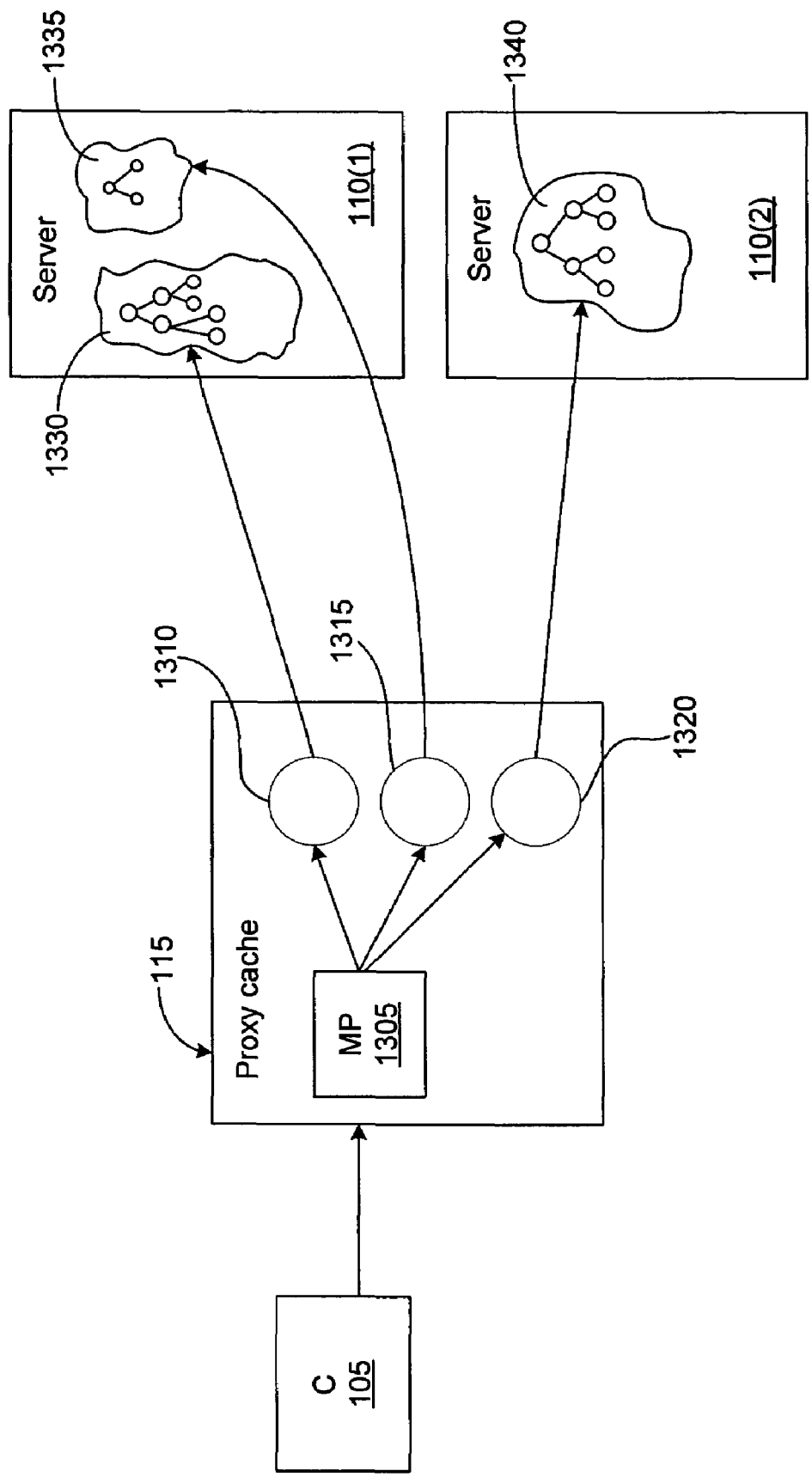
FIG. 13 is a block diagram of a proxy cache with mountpoint consolidation, in accordance with an embodiment of the invention.

FIG. 13 is a block diagram of a proxy cache 115 with mountpoint consolidation, in accordance with an embodiment of the invention. The proxy cache 115 includes a mountpoint 1305 which is an administration unit to access a file system. The mountpoint 1305 permits a client to view the directory folder 1310, 1315, and 1320, where the directory folder 1310 points to file system 1330 on server 110(1), directory folder 1315 points to file system 1335 on server 110(1), and directory folder 1320 points to file system 1340 on second server 110(2). Thus, each directory folder 1310, 1315, and 1320 will contain volume names assigned to particular servers 110(1) and 110(2). It is noted that the number of servers, file systems in each server, and volumes in each file system may vary. Therefore, the directory folders 1310–1320 are virtually mapped to the mountpoint 1305. The clients 105 need only know about a single mountpoint (e.g., mount point 1310 may be identified as "/global") to access volumes in one or more servers 110. The mapping 600 (see FIG. 6) is used to permit the file handles 400 to be virtual access points into volumes of servers 110, along with the re-writing of file handles in the NFS protocol. The file handles for each file from a particular server is re-written (mutated) based on the IP address of the particular server, and a mapping 600 of the file handle mutations is stored in the proxy cache 115. As mentioned above, the mount process involves communicating with the server to get the root file handle for the file system, which can later be passed to the lookup Remote Procedure Call (RPC) to locate other file handles in the remote file system directory hierarchy.

An advantage permitted by the single mount point is that the clients 105 need not be aware of every single mountpoint that were previously required to access a file system that is associated with a particular mountpoint.

In an embodiment of the invention, each client 105 will only need to mount the mountpoint 1305 and this single consolidated mountpoint leads to simplified mountpoint management.

The various engines or modules discussed herein may also be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Aspects of the invention may also be implemented in hardware, software, firmware, and/or a combination of any of hardware, software, or firmware.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of processing data in a network with multiple proxy caches, the method comprising:
   defining a cluster configuration including a first proxy cache and a second proxy cache, where the cluster configuration designates the second proxy cache to receive cached data from the first proxy cache, wherein each of the first and second proxy caches includes an associated group member module that defines the cluster configuration;
   pushing cached data in the first proxy cache to the second proxy cache in the cluster configuration;
   caching, by the second proxy cache, the data from the first proxy cache; and
   permitting a client to access the data in the second proxy cache in the cluster configuration.

2. The method of claim 1, wherein the data is cached in the second proxy cache for a minimum time period.

3. The method of claim 1, further comprising:
   in response to a client access request, directing the request to one of the proxy caches in the cluster configuration to achieve load balancing.

4. The method of claim 1, wherein the cached data pushed to the second proxy cache is a frequently requested data.

5. The method of claim 1, further comprising:
   performing a fail-over from the first proxy cache to the second proxy cache in the cluster configuration, in response to failure of the first proxy cache.

6. The method of claim 5, wherein the second proxy cache receives request from a client after the fail-over to the second proxy cache is performed.

7. The method of claim 6, wherein the second proxy cache can send the cached data to the client in response to the request from the client.

8. The method of claim 1, wherein the first proxy cache can transmit cached data to a requesting client.

9. The method of claim 1, wherein the second proxy cache in the cluster configuration can transmit the cached data to a requesting client.

10. The method of claim 1, wherein the second proxy cache is prevented from transmitting the cached data to a requesting client for a designated time period.

11. The method of claim 1, wherein the first proxy cache and the second proxy cache can receive a write request from a client to modify the cached data and to send the modified cached data to a server.

12. The method of claim 1, wherein the first proxy cache includes a first control manager module, wherein the second proxy cache includes second control manager module, and wherein the first and second control manager modules set a schedule for transmitting the cached data from the first proxy cache to the second proxy cache.

13. The method of claim 1, wherein the first proxy cache includes a first control manager module, wherein the second proxy cache includes second control manager module, and wherein the first and second control manager modules designates the second proxy cache to receive cached data from the first proxy cache and prevent other proxy caches from receiving the cached data.

14. The method of claim 1, wherein the first proxy cache includes a group leader module, wherein the second proxy cache includes group member module, and wherein the group leader module coordinates with the group member module so that the cached data is sent from the first proxy cache to the second proxy cache and so that other proxy caches are prevented from receiving the cached data.

15. The method of claim 1, wherein the first proxy cache includes a group member module, wherein the second proxy cache includes second group member module, and wherein the first and second group member modules configure the first proxy cache and the first proxy cache as belonging to the cluster configuration.

16. The method of claim 1, further comprising:
   placing a timeout header in the cached data, where the timeout header sets a timeout time period when the cached data is eligible for flushing from the second proxy cache.

17. The method of claim 1, further comprising:
placing a minimum age header in the cached data, where the minimum age header sets an aged time period when the cached data is eligible to be served by the second proxy cache to a requesting client.

18. An apparatus for processing data in a network with multiple proxy caches, the apparatus comprising:
a cluster configuration including a first proxy cache and a second proxy cache, where the cluster configuration designates the second proxy cache to receive cached data from the first proxy cache, wherein each of the first and second proxy caches includes an associated group member module that defines the cluster configuration;
wherein the first proxy cache is configured to push cached data to the second proxy cache in the cluster configuration;
wherein the second proxy cache is configured to cache the data from the first proxy cache; and
wherein the first proxy cache and the second proxy cache permits a client to access the cached data.

19. The apparatus of claim 18, wherein the data is cached in the second proxy cache for a minimum time period.

20. The apparatus of claim 18, further comprising:
a load balancing switch configured to direct a client access request to one of the proxy caches in the cluster configuration to achieve load balancing in response to the client access request.

21. The apparatus of claim 18, wherein the cached data pushed to the second proxy cache is a frequently requested data.

22. The apparatus of claim 18, wherein fail-over from the first proxy cache to second proxy cache in the cluster configuration is performed, in response to failure of the first proxy cache.

23. The apparatus of claim 22, wherein the second proxy cache receives request from a client after the fail-over to the second proxy cache is performed.

24. The apparatus of claim 23, wherein the second proxy cache can send the cached data to the client in response to the request from the client.

25. The apparatus of claim 18, wherein the first proxy cache can transmit cached data to a requesting client.

26. The apparatus of claim 18, wherein the second proxy cache in the cluster configuration can transmit the cached data to a requesting client.

27. The apparatus of claim 18, wherein the second proxy cache is prevented from transmitting the cached data to a requesting client for a designated time period.

28. The apparatus of claim 18, wherein the first proxy cache and the second proxy cache can receive a write request from a client to modify the cached data and to send the modified cached data to a server.

29. The apparatus of claim 18, wherein each of the first proxy cache and the second proxy cache is configured to verify the cached data.

30. The apparatus of claim 18, wherein the first proxy cache includes a first control manager module, wherein the second proxy cache includes second control manager module, and wherein the first and second control manager modules set a schedule for transmitting the cached data from the first proxy cache to the second proxy cache.

31. The apparatus of claim 18, wherein the first proxy cache includes a first control manager module, wherein the second proxy cache includes second control manager module, and wherein the first and second control manager modules designates the second proxy cache to receive cached data from the first proxy cache and prevent other proxy caches from receiving the cached data.

32. The apparatus of claim 18, wherein the first proxy cache includes a group leader module, wherein the second proxy cache includes group member module, and wherein the group leader module coordinates with the group member module so that the cached data is sent from the first proxy cache to the second proxy cache and so that other proxy caches are prevented from receiving the cached data.

33. The apparatus of claim 18, wherein the first proxy cache includes a group member module, wherein the second proxy cache includes second group member module, and wherein the first and second group member modules configure the first proxy cache and the first proxy cache as belonging to the cluster configuration.

34. The apparatus of claim 18, further comprising:
a timeout header in the cached data, where the timeout header sets a timeout time period when the cached data is eligible for flushing from the second proxy cache.

35. The apparatus of claim 18, further comprising:
a minimum age header in the cached data, where the minimum age header sets an aged time period when the cached data is eligible to be served by the second proxy cache to a requesting client.

* * * * *